(12) United States Patent
Chung et al.

(10) Patent No.: US 11,300,533 B2
(45) Date of Patent: Apr. 12, 2022

(54) CLEANING APPARATUS AND METHOD

(71) Applicant: MYONGJI UNIVERSITY INDUSTRY AND ACADEMIA COOPERATION FOUNDATION, Yongin-si (KR)

(72) Inventors: Sang Kug Chung, Yongin-si (KR); Kang Yong Lee, Goyang-si (KR); Dae Young Lee, Yeoju-si (KR)

(73) Assignee: MYONGJI UNIVERSITY INDUSTRY AND ACADEMIA COOPERATION FOUNDATION, Yongin-si (KR)

( * ) Notice: Subject to any disclaimer, the term of this patent is extended or adjusted under 35 U.S.C. 154(b) by 242 days.

(21) Appl. No.: 16/302,636

(22) PCT Filed: May 15, 2017

(86) PCT No.: PCT/KR2017/004996
§ 371 (c)(1),
(2) Date: Nov. 17, 2018

(87) PCT Pub. No.: WO2017/200242
PCT Pub. Date: Nov. 23, 2017

(65) Prior Publication Data
US 2019/0277787 A1  Sep. 12, 2019

(30) Foreign Application Priority Data

May 18, 2016  (KR) .................. 10-2016-0060833
Oct. 19, 2016  (KR) .................. 10-2016-0135939
(Continued)

(51) Int. Cl.
*B08B 7/02*  (2006.01)
*B08B 11/00*  (2006.01)
(Continued)

(52) U.S. Cl.
CPC ............... *G01N 27/06* (2013.01); *B08B 7/02* (2013.01); *B08B 11/00* (2013.01); *B60J 1/00* (2013.01);
(Continued)

(58) Field of Classification Search
CPC ... B08B 7/02; B08B 11/00; B60S 1/02; B60S 1/62; B60S 1/66; B60S 1/56; G02B 27/0006
See application file for complete search history.

(56) References Cited

U.S. PATENT DOCUMENTS 5,668,478 A        9/1997  Buschur
2008/0169197 A1*   7/2008  McRuer ............ B01F 13/0086
                                                    204/600
(Continued)

FOREIGN PATENT DOCUMENTS

JP      06001205       6/1992
JP      2002114538    10/2000
(Continued)

OTHER PUBLICATIONS

D. J. C. M. 't Mannetje, C. U. Murade, D. van den Ende, and F. Mugele, Electrically assisted drop sliding on inclined planes, Citation: Appl. Phys. Lett. 98, 014102 (2011); doi: 10.1063/1.3533362.
(Continued)

*Primary Examiner* — Natasha N Campbell

(57) ABSTRACT

An apparatus and a method for cleaning glass used in cars or cameras are disclosed. Said cleaning apparatus comprises glass, multiple electrodes placed in series on top of said glass, a dielectric layer stacked on top of said electrodes, and a hydrophobic layer stacked on top of said dielectric layer and on whose surface a droplet forms. Here, said droplet moves towards the outer edge of said glass by application of differing direct current voltages to several of said electrodes.

4 Claims, 21 Drawing Sheets

(30) Foreign Application Priority Data

| Oct. 19, 2016 | (KR) | 10-2016-0135940 |
| Oct. 19, 2016 | (KR) | 10-2016-0135941 |
| Oct. 19, 2016 | (KR) | 10-2016-0135942 |
| Feb. 1, 2017 | (KR) | 10-2017-0014622 |
| May 8, 2017 | (KR) | 10-2017-0057410 |

(51) Int. Cl.
| G02B 27/00 | (2006.01) |
| B60S 1/02 | (2006.01) |
| B60S 1/62 | (2006.01) |
| B60J 1/00 | (2006.01) |
| G01N 27/06 | (2006.01) |
| G01N 21/17 | (2006.01) |
| G02B 26/00 | (2006.01) |

(52) U.S. Cl.
CPC . *B60S 1/02* (2013.01); *B60S 1/62* (2013.01); *G01N 21/17* (2013.01); *G02B 26/00* (2013.01); *G02B 26/004* (2013.01); *G02B 27/00* (2013.01); *G02B 27/0006* (2013.01)

(56) References Cited

U.S. PATENT DOCUMENTS

| 2010/0307922 A1* | 12/2010 | Wu | B01L 3/502792 |
| | | | 204/643 |
| 2014/0158213 A1* | 6/2014 | Usui | B08B 17/02 |
| | | | 137/13 |
| 2016/0137166 A1* | 5/2016 | Trevett | B60S 1/02 |
| | | | 134/1 |

FOREIGN PATENT DOCUMENTS

| JP | 2012138768 | 12/2010 |
| KR | 1020100035691 | 4/2010 |

OTHER PUBLICATIONS

Eral, H. B., D. J. C. M. 't Mannetje, and J. M. Oh. "Contact Angle Hysteresis: a Review of Fundamentals and Applications." Colloid Polym Sci 291, No. 2 (Feb. 2013): 247-260.
International Search Report of PCT/KR2017/004996, dated Oct. 24, 2017.

* cited by examiner

[FIG. 1]
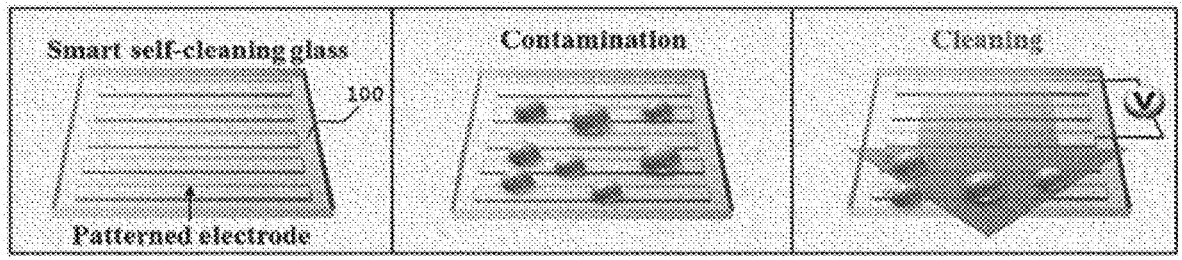
[FIG. 2]
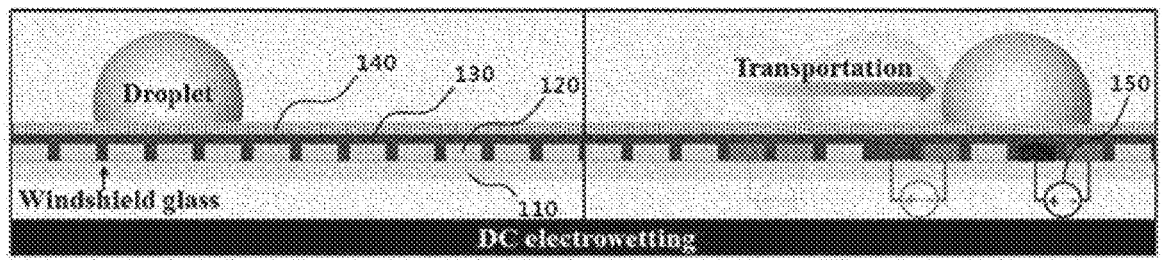
[FIG. 3]
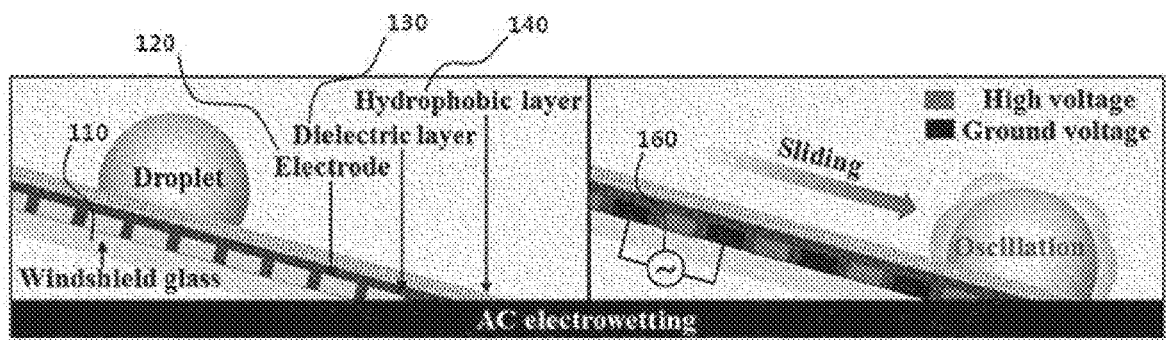

[FIG. 4]
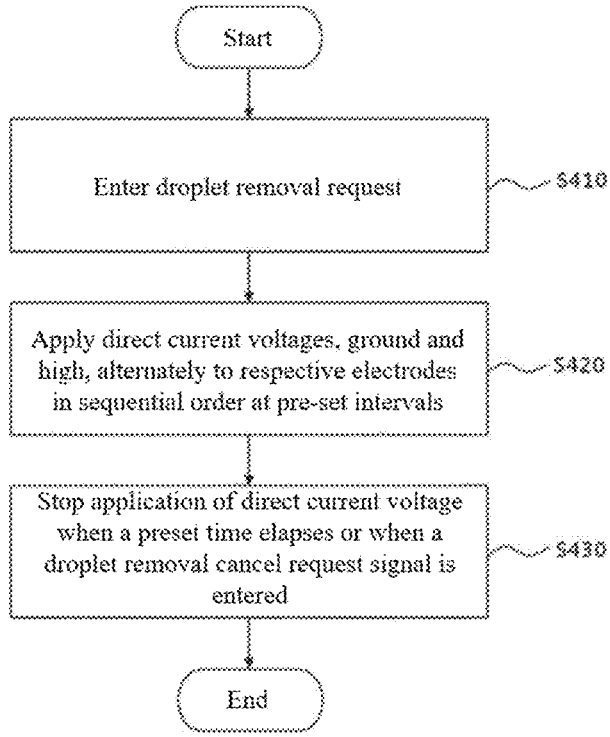
[FIG. 5]
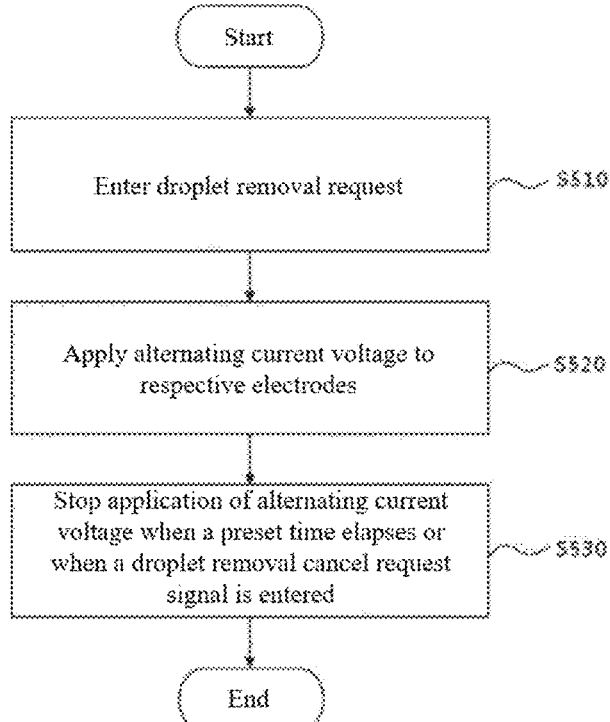

[FIG. 6]
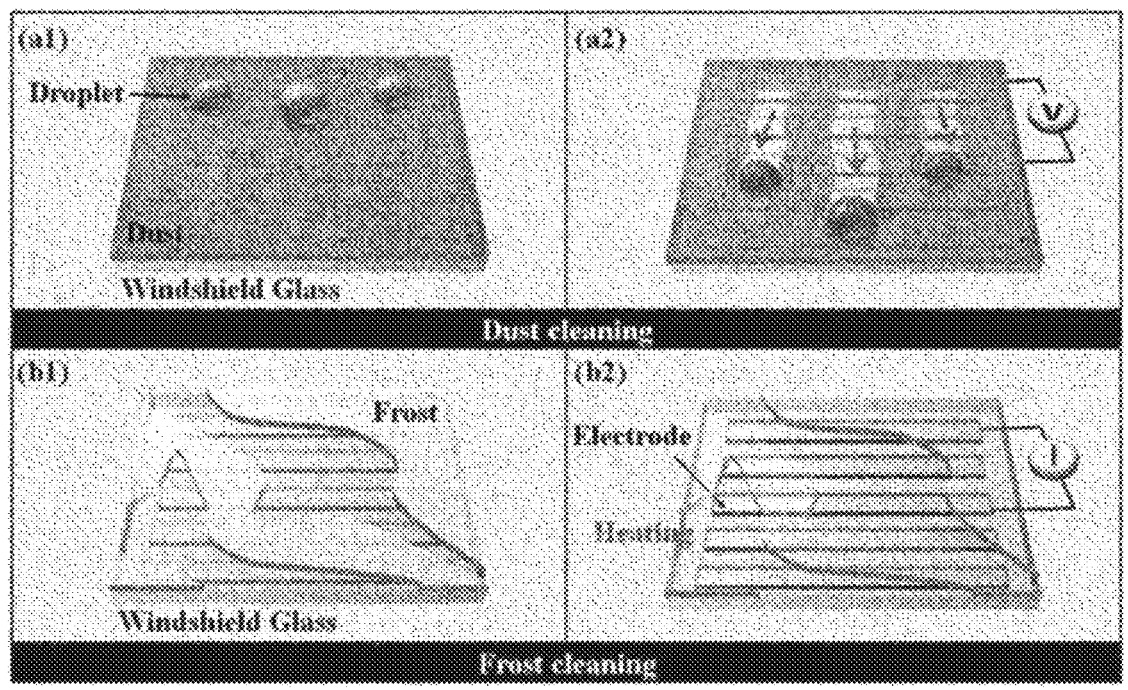

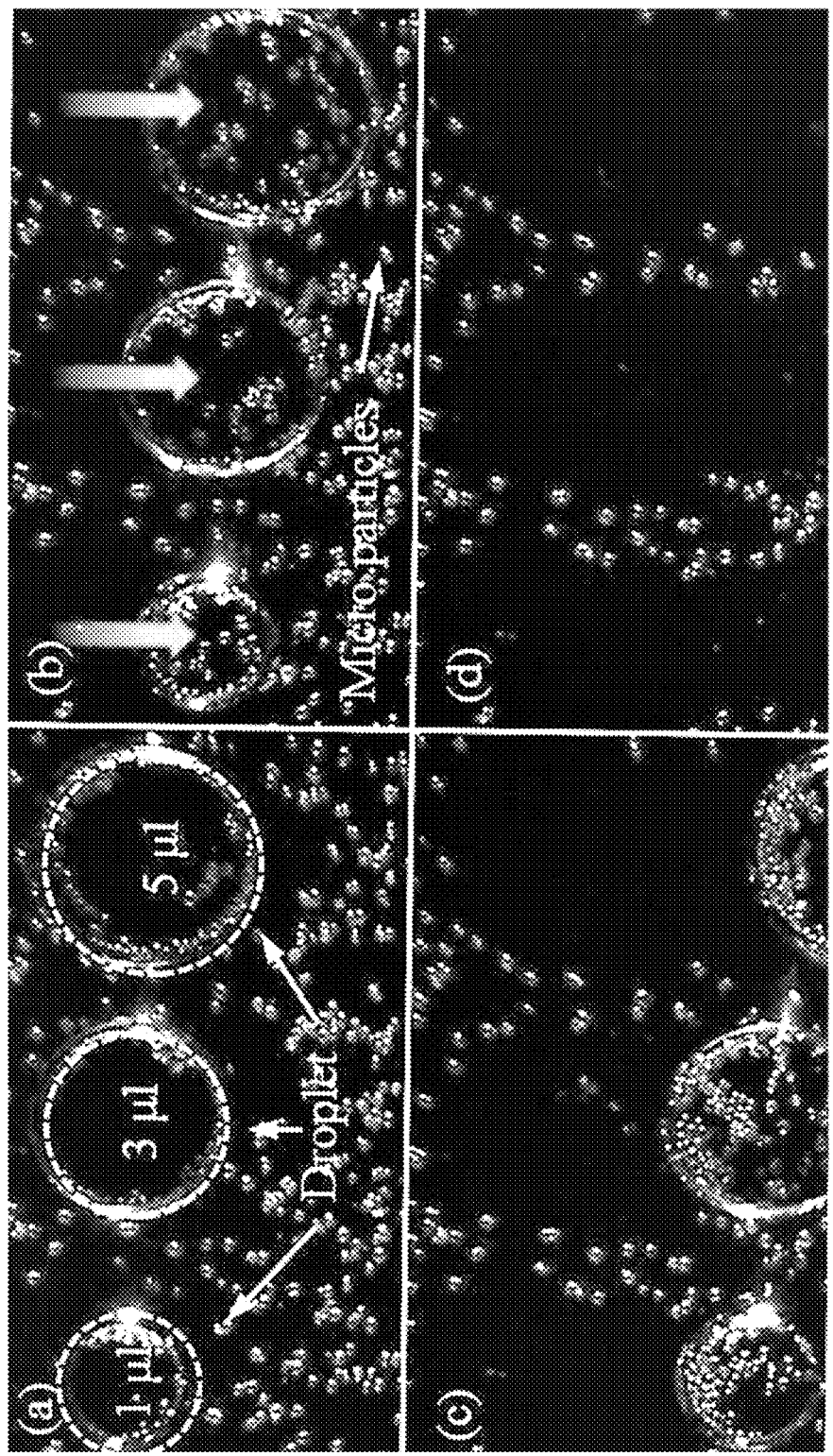
[FIG. 7]

[FIG. 8]
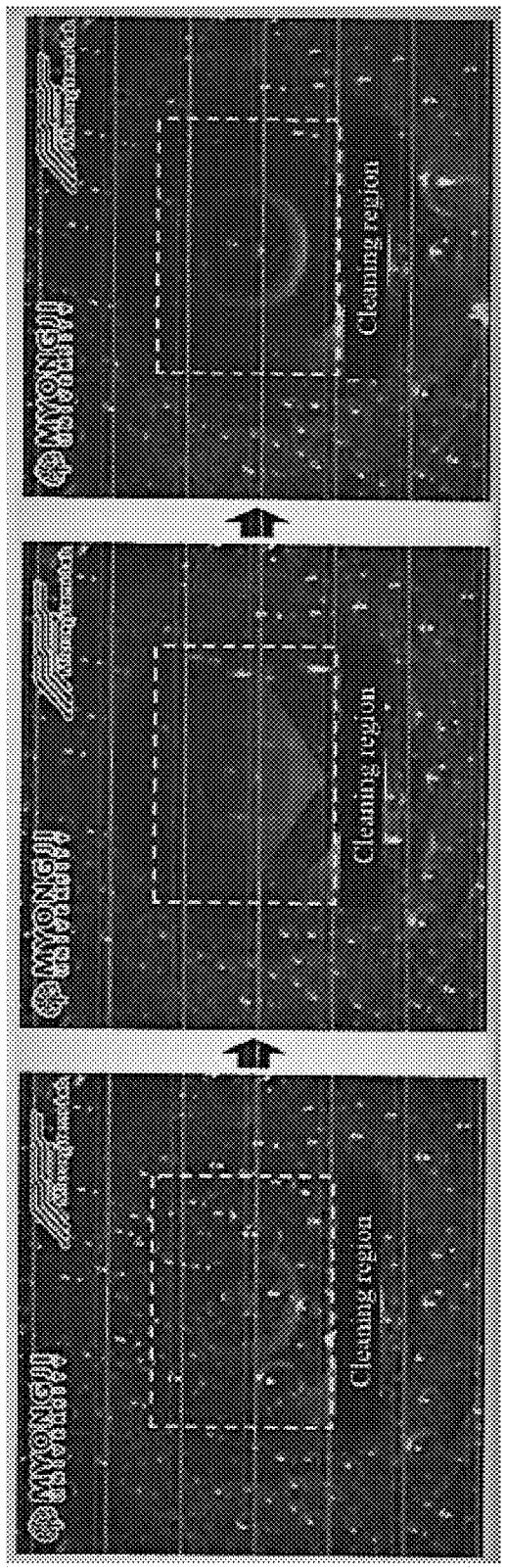
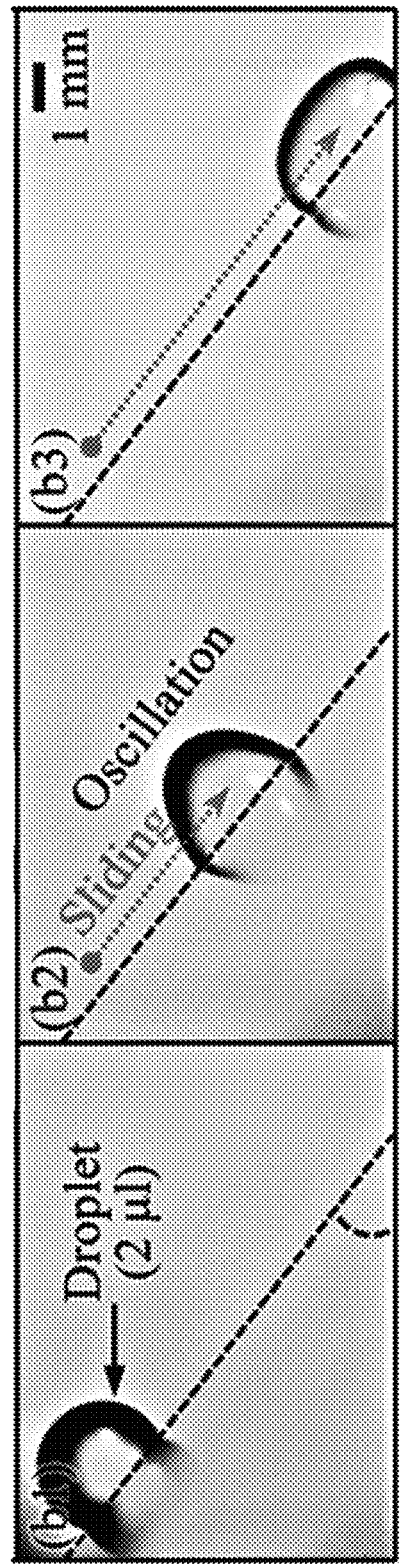
(A)
(B)

[FIG. 9]
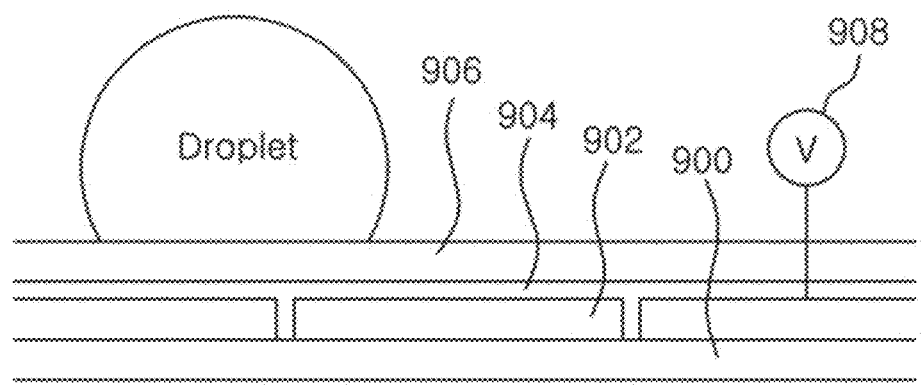
[FIG. 10]
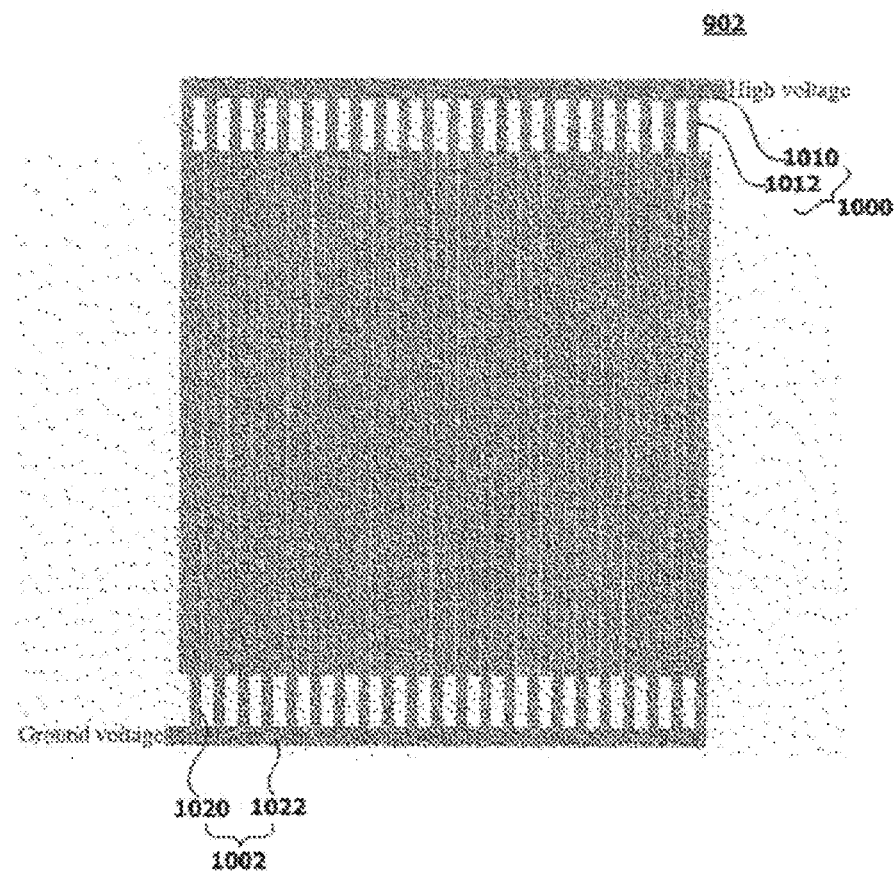

[FIG. 11]
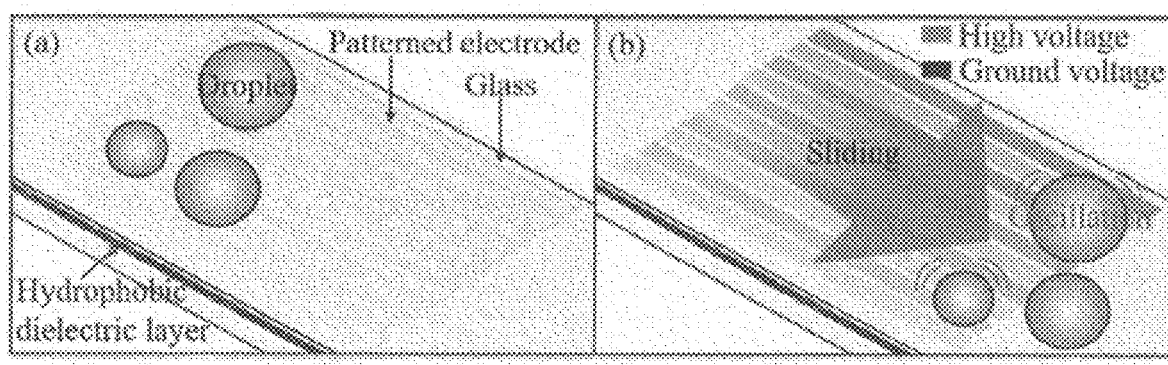
[FIG. 12]
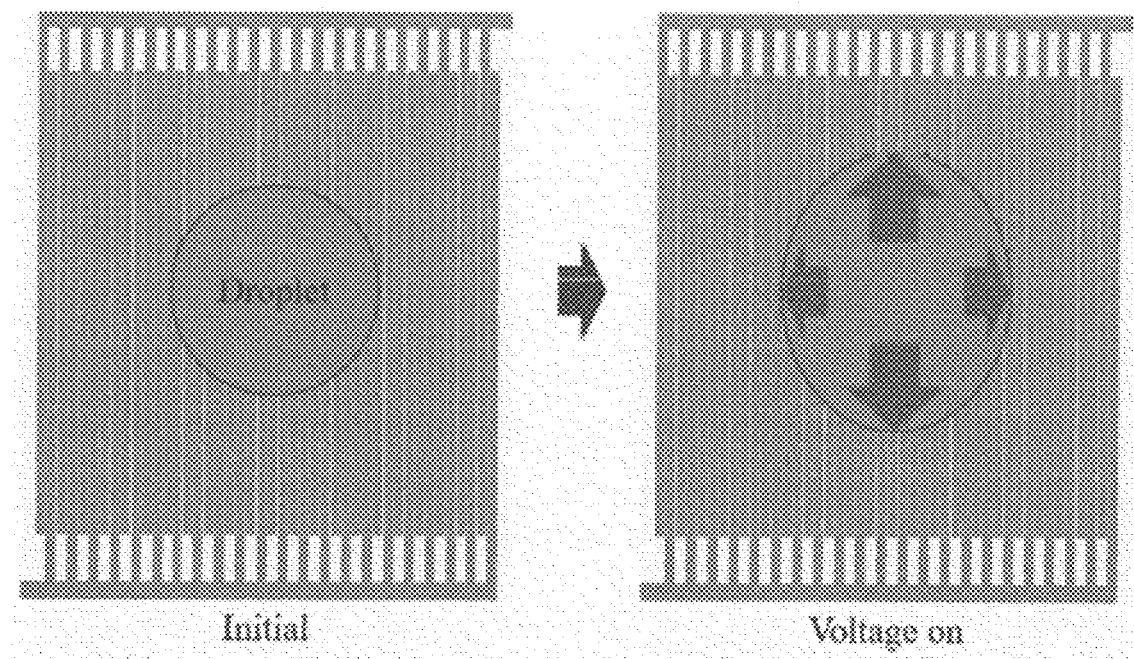

[FIG. 13]
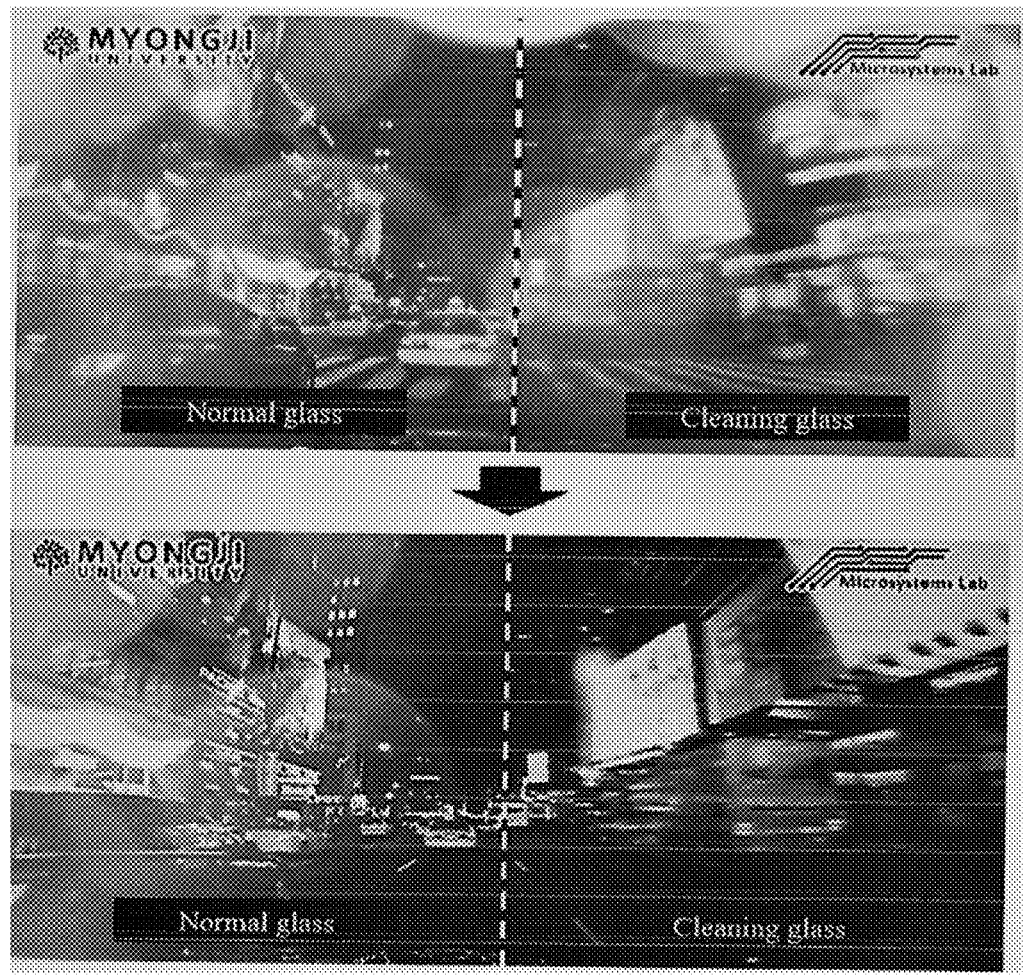
(A)
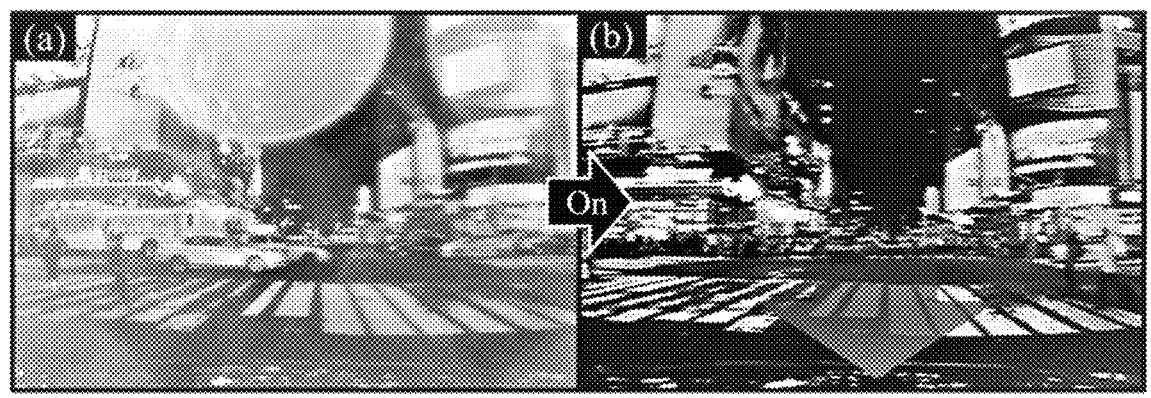
(B)

[FIG. 14]
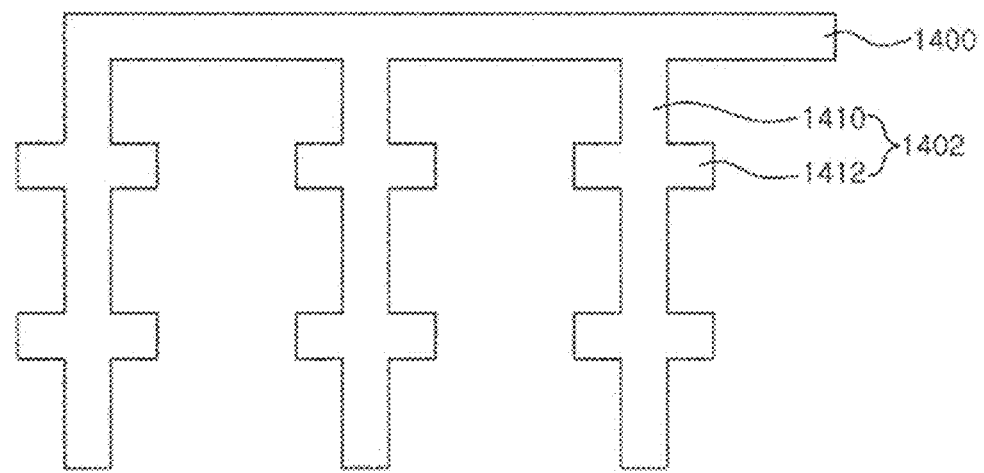

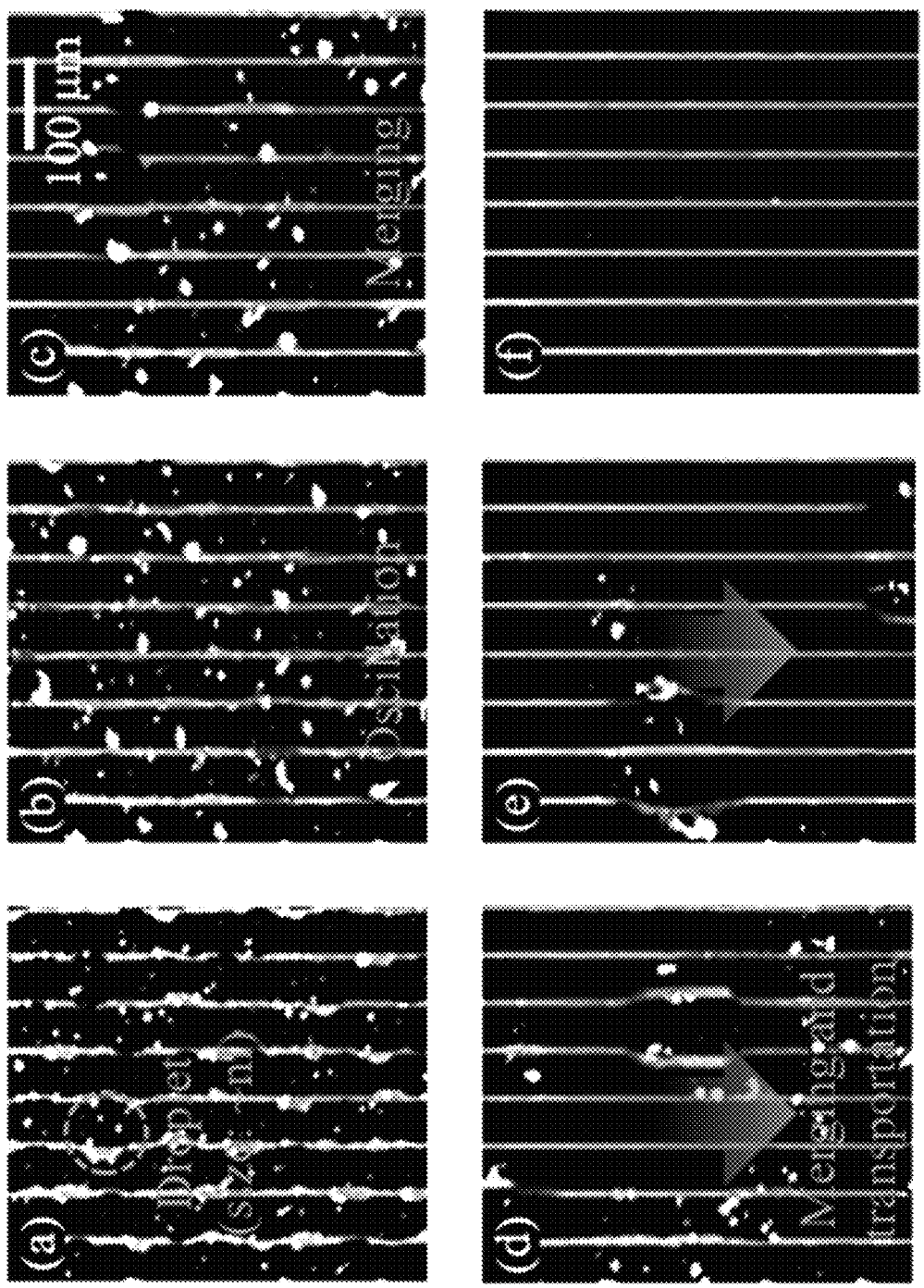
[FIG. 15]

[FIG. 16]
[FIG. 17]
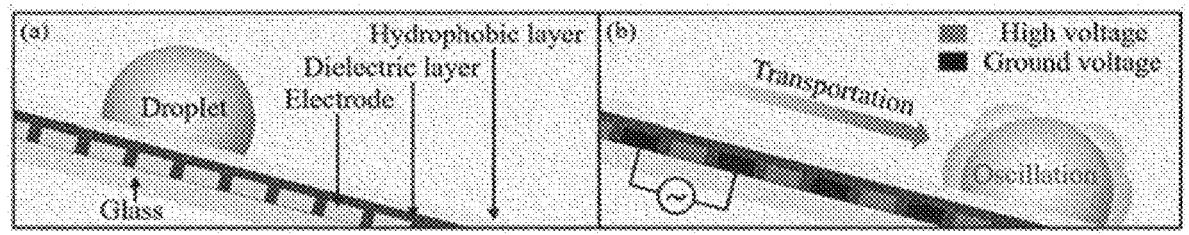

[FIG. 18]
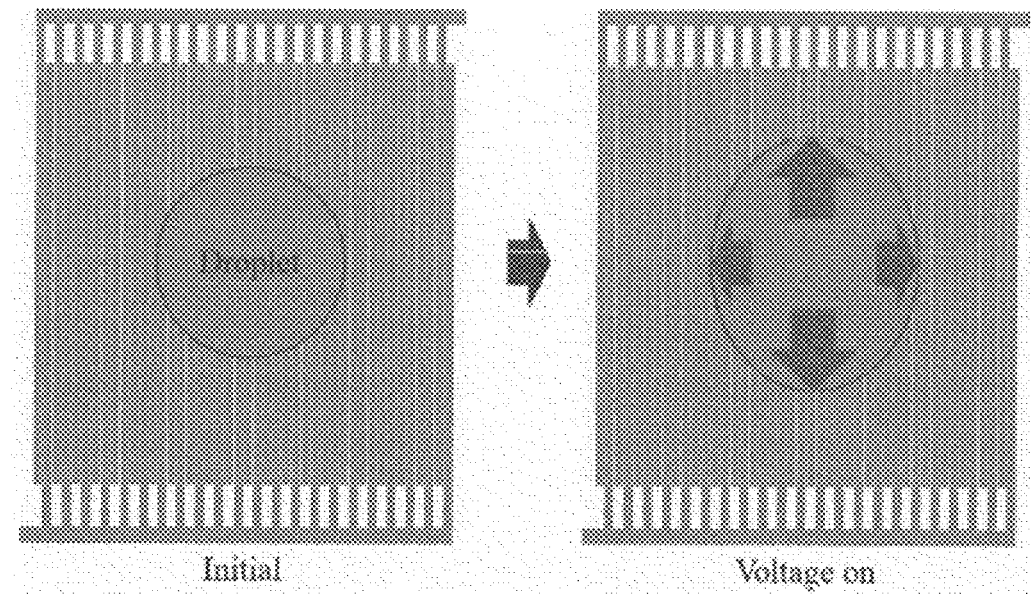
[FIG. 19]
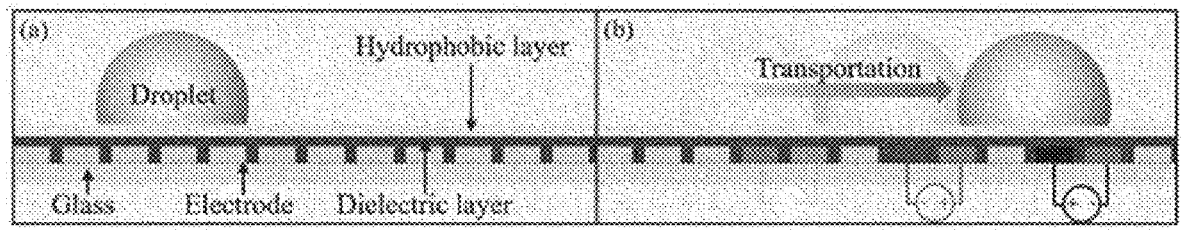

[FIG. 20]
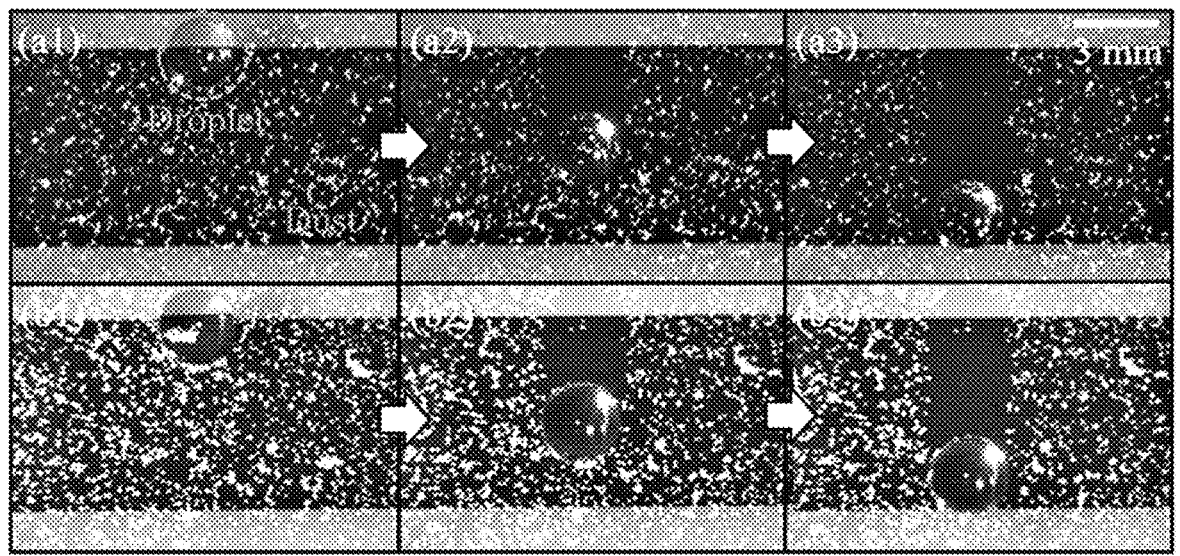
(A)
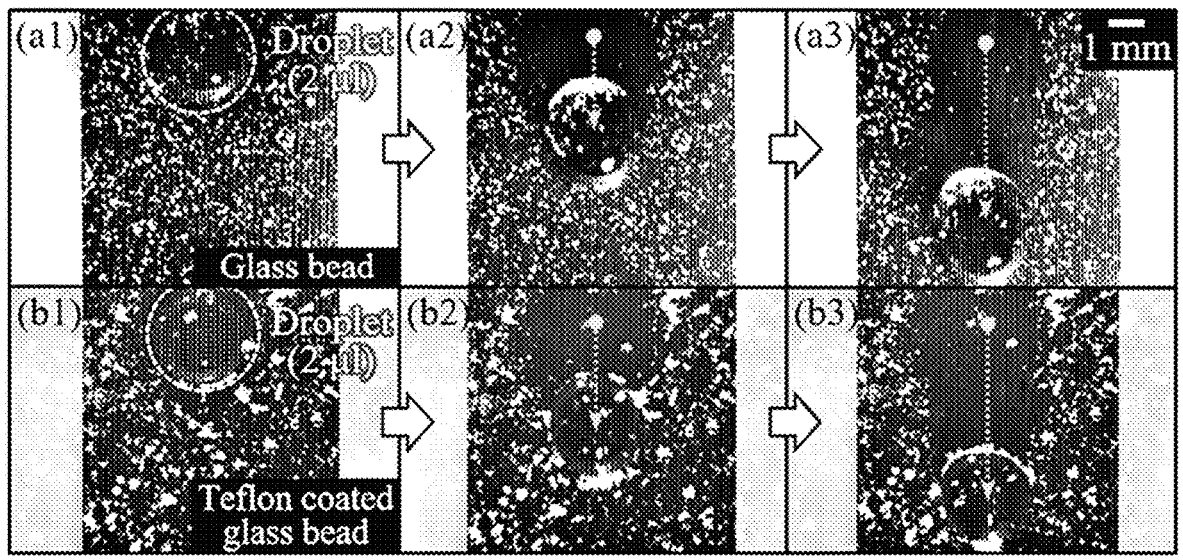
(B)

[FIG. 21]
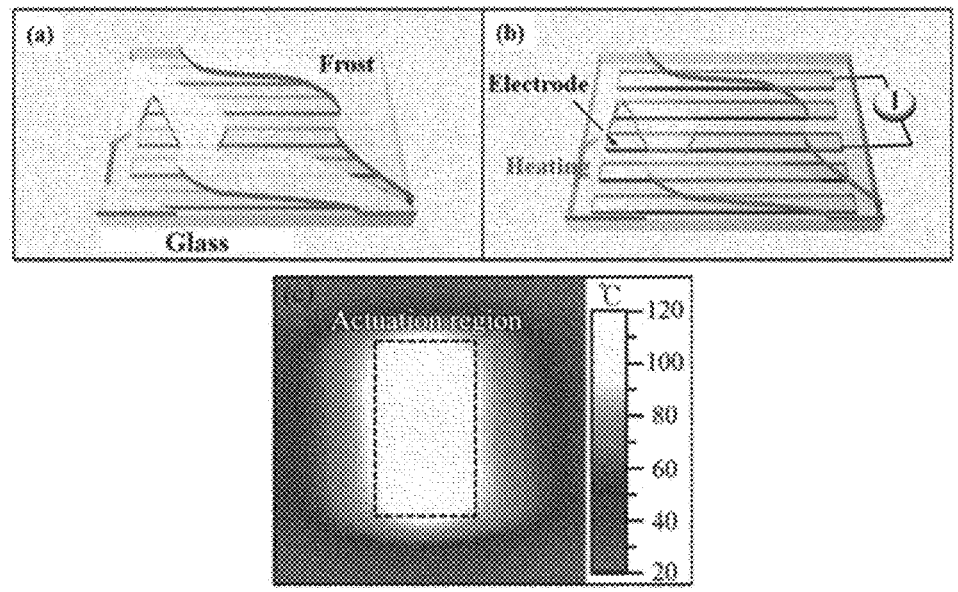
[FIG. 22]
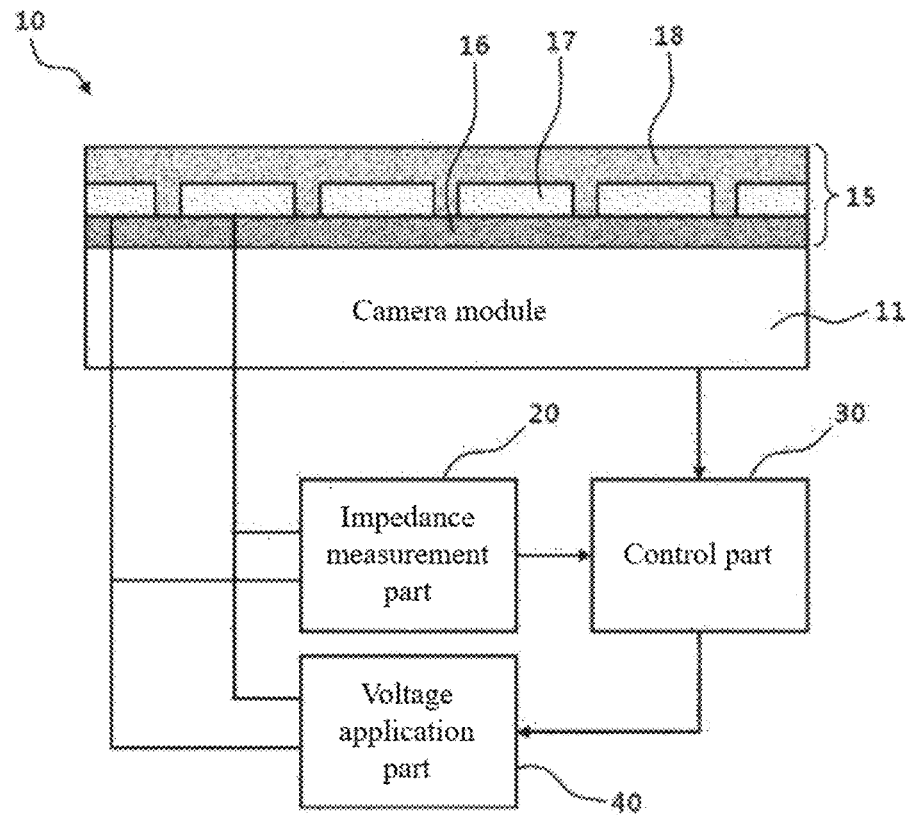

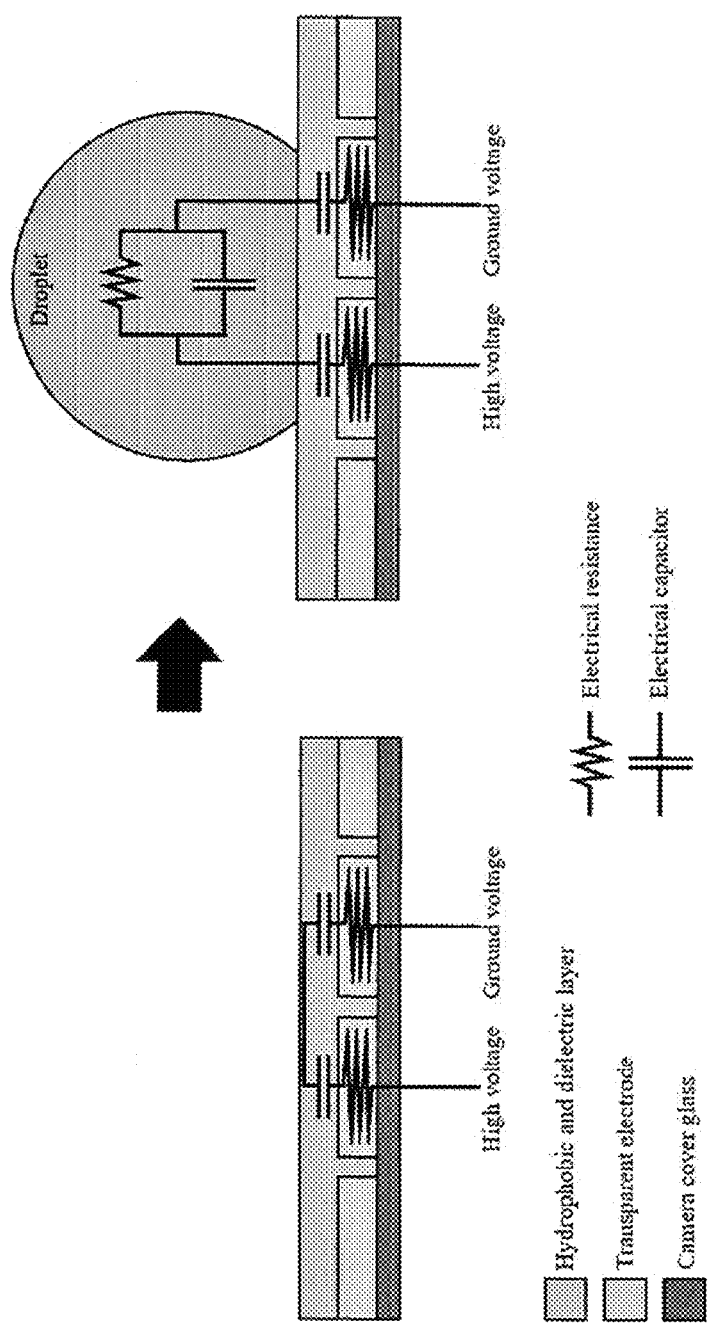

[FIG. 24]

[FIG. 25]
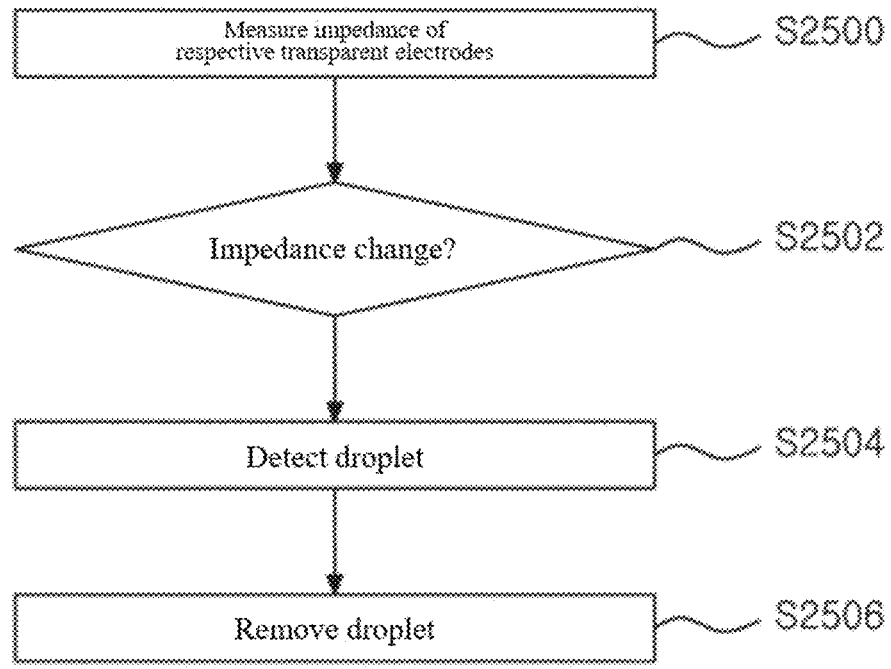
[FIG. 26]
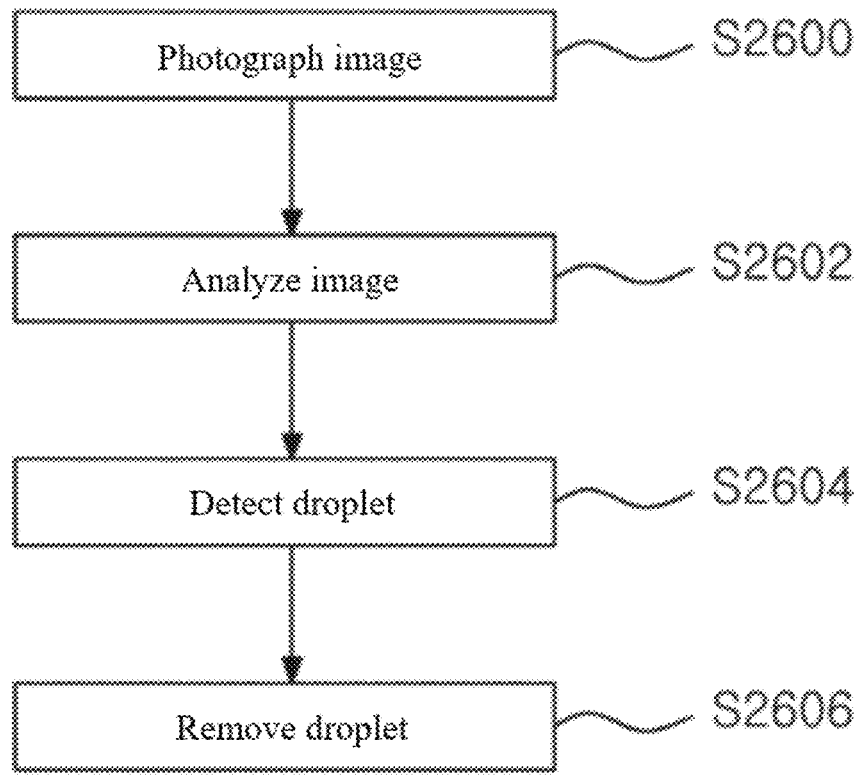

[FIG. 27]
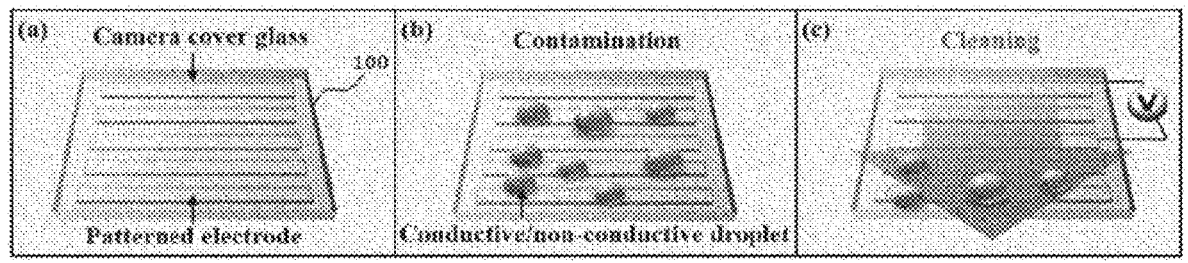
[FIG. 28]
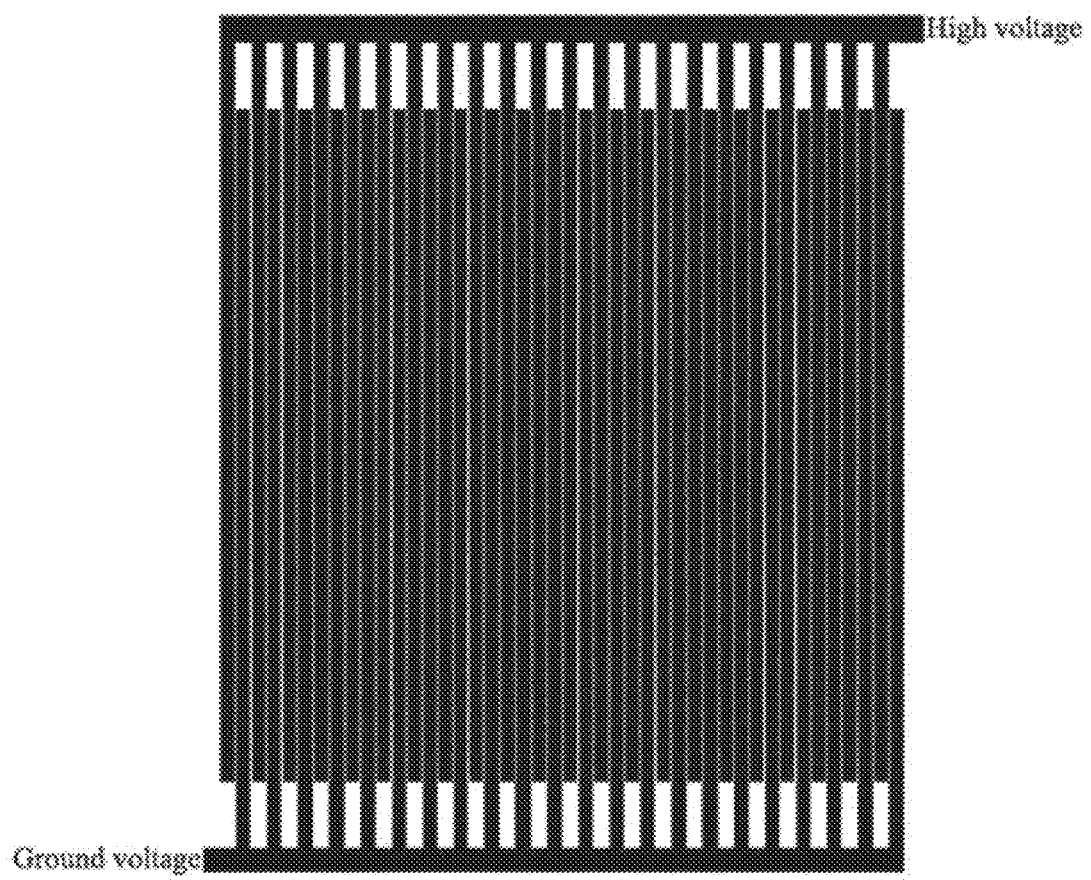

[FIG. 29]
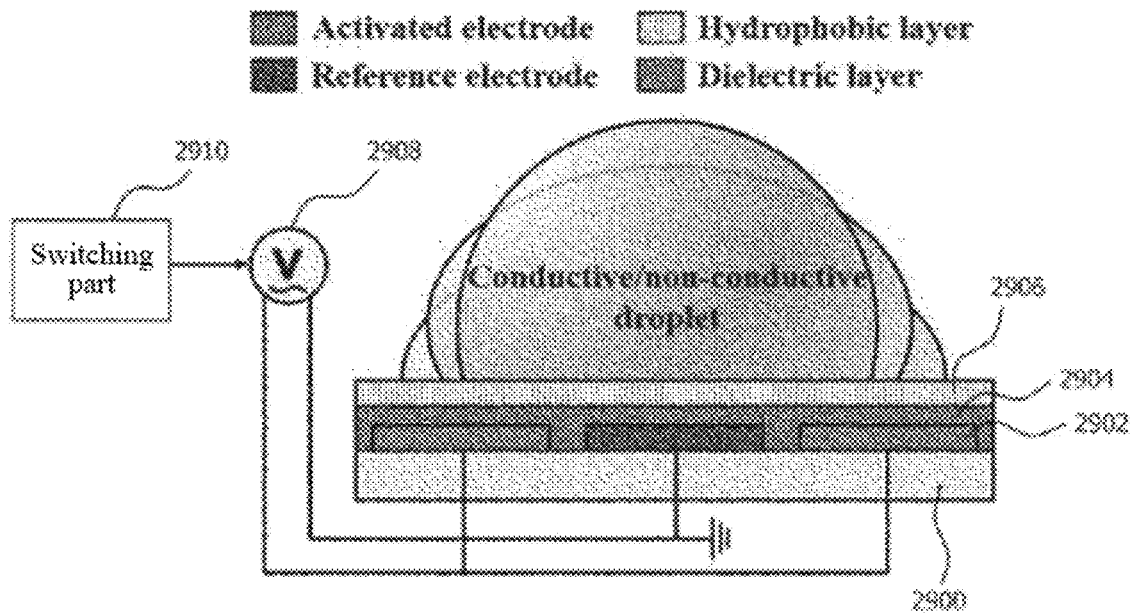
[FIG. 30]
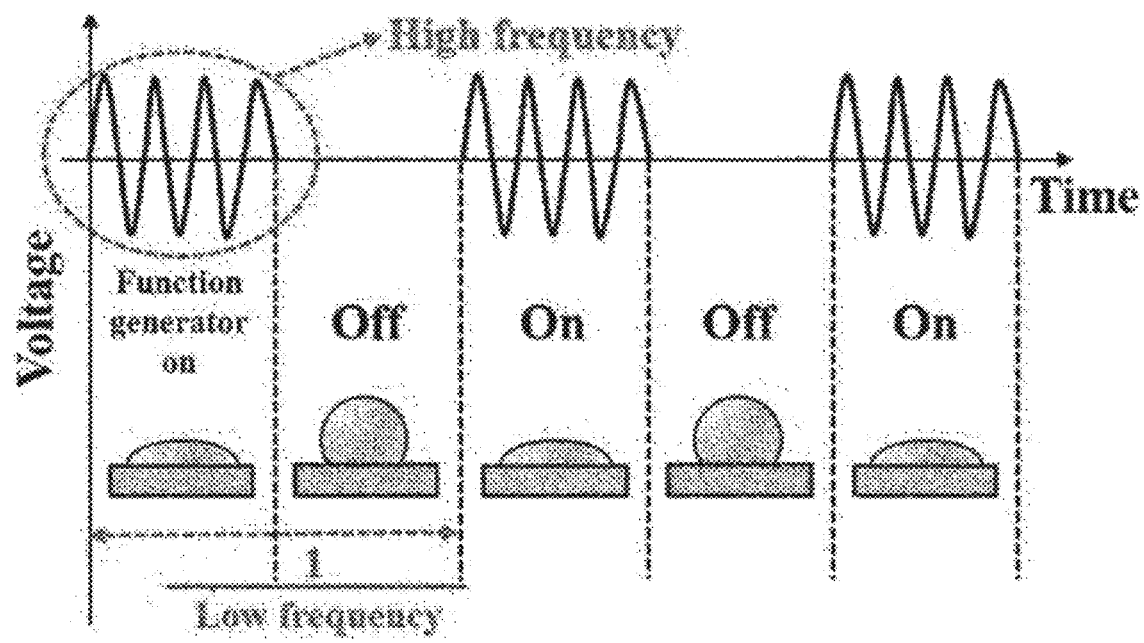

[FIG. 31]
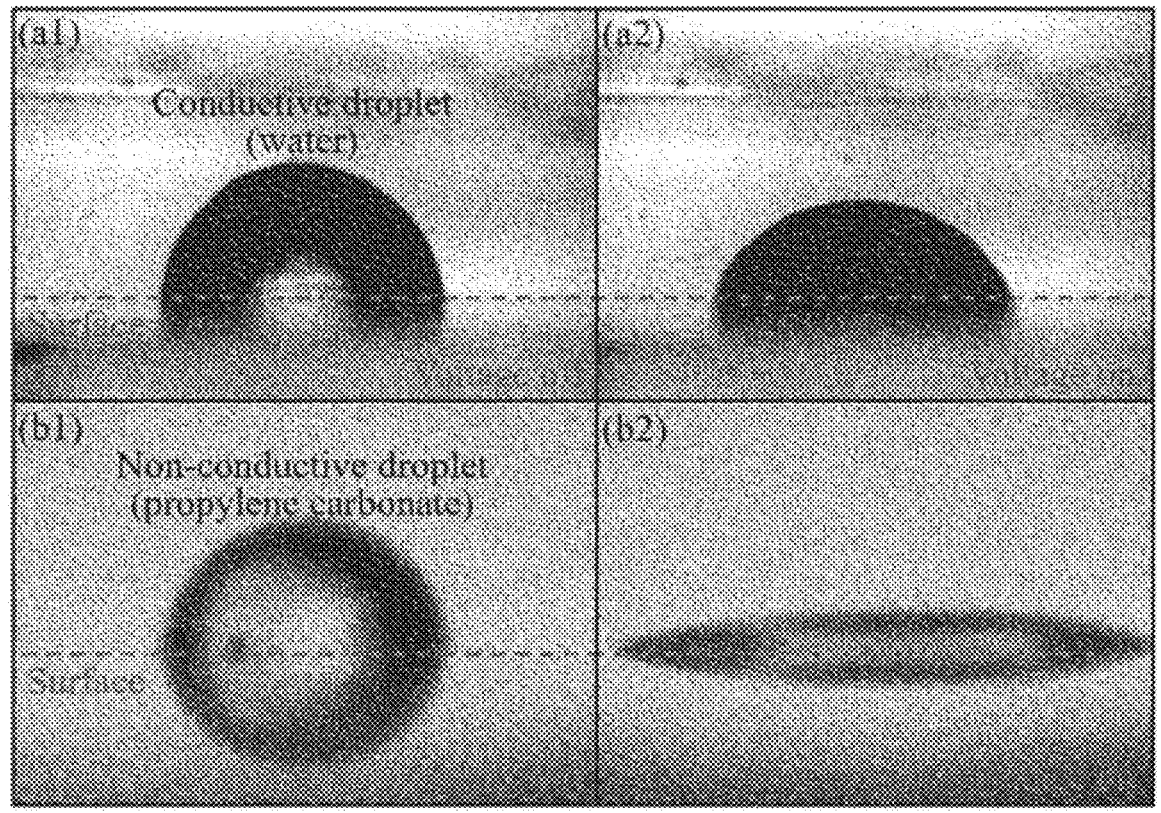
[FIG. 32]
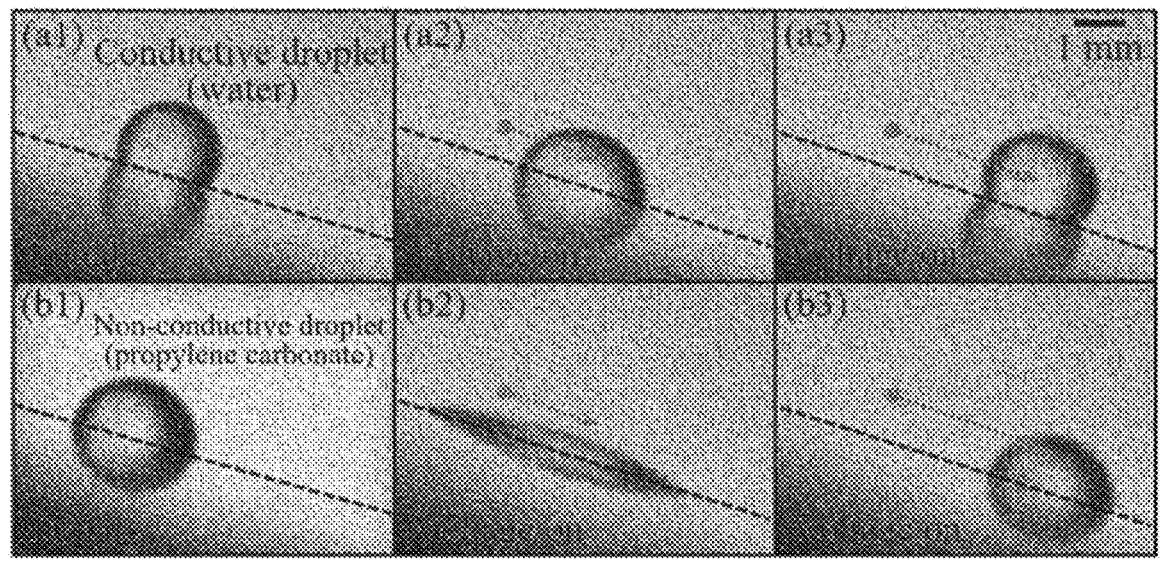

[FIG. 33]
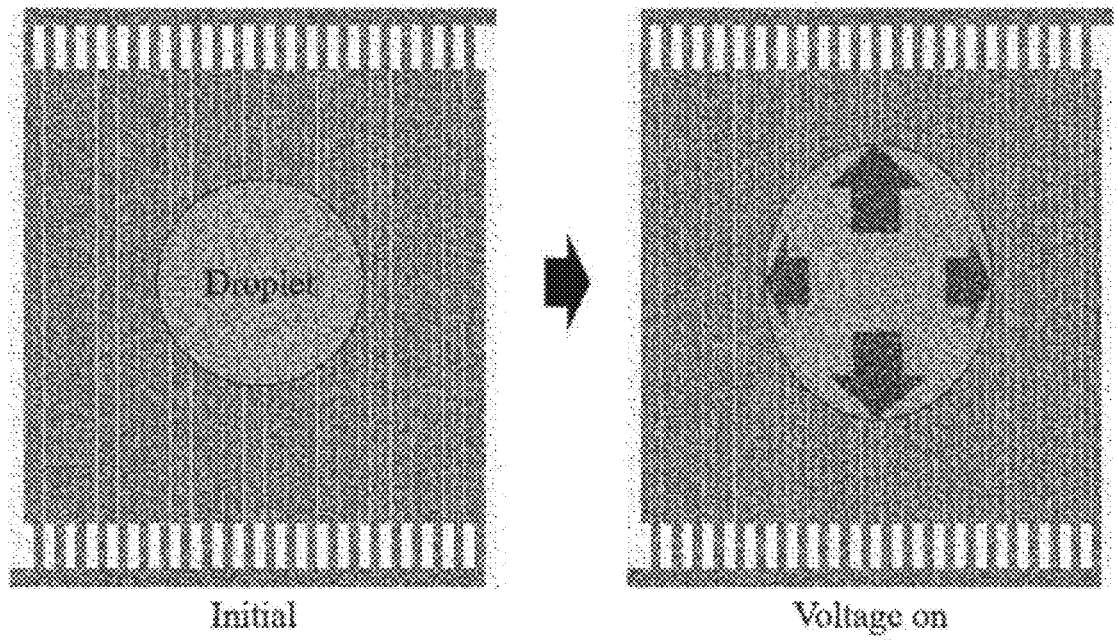
Initial        Voltage on
[FIG. 34]
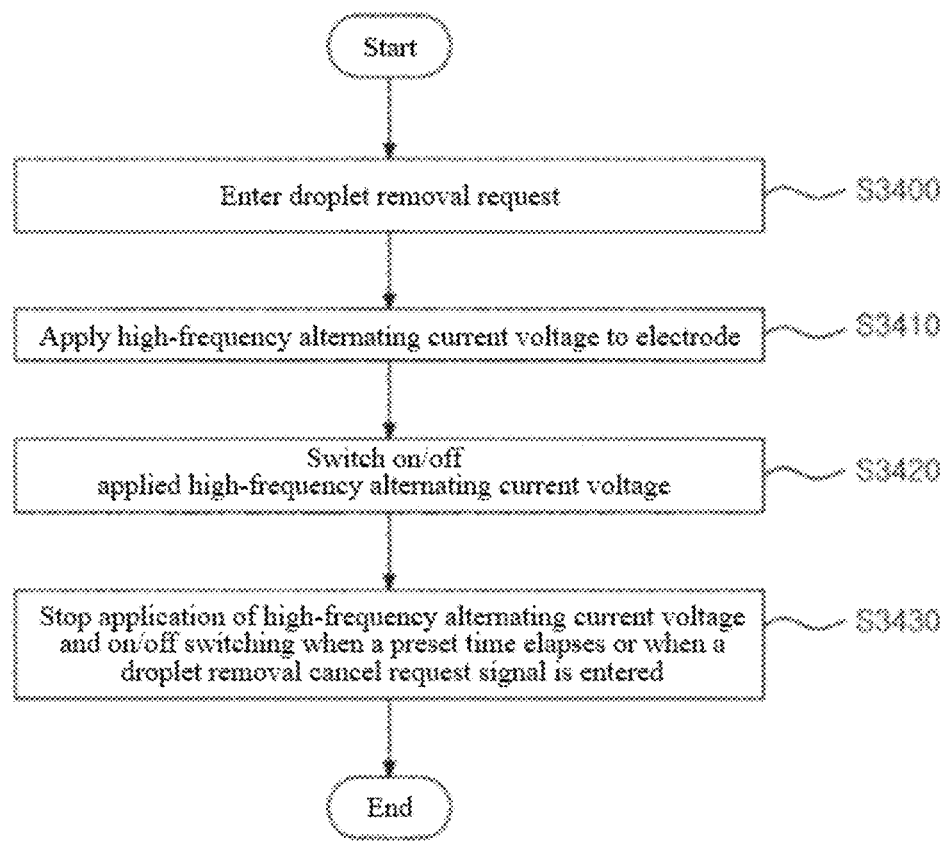

CLEANING APPARATUS AND METHOD

CROSS-REFERENCE TO PRIOR APPLICATIONS

This application is a National Stage Patent Application of PCT International Patent Application No. PCT/KR2017/004996 (filed May 15, 2018) under 35 U.S.C. § 371, which claims the benefit of foreign priority of Korean Patent Application No. 10-2016-0060833 (filed May 18, 2016), Korean Patent Application No. 10-2016-0135942 (filed Oct. 19, 2016), Korean Patent Application No. 10-2016-0135939 (filed Oct. 19, 2016), Korean Patent Application No. 10-2016-0135940 (filed Oct. 19, 2016), Korean Patent Application No. 10-2016-0135941 (filed Oct. 19, 2016), Korean Patent Application No. 10-2017-0014622 (filed Feb. 1, 2017), and Korean Patent Application No. 10-2017-0057410 (filed May 8, 2017), the subject matter of which are hereby incorporated by reference in its entirety.

TECHNICAL FIELD

The present invention relates to an apparatus and a method for cleaning glass used in vehicles or cameras. More specifically, it relates to a technology for removing droplets forming on glass surfaces.

Furthermore, the present invention relates to an apparatus and a method for detecting droplets on cameras.

Moreover, the present invention relates to a cleaning apparatus and method for removing both conductive and non-conductive droplets that form on surfaces using the principle of electrowetting-on-dielectric.

BACKGROUND ART

Recently, the wider adoption of automotive electrical parts and smart cars has led to the advent of head-up-display (HUD) technology that projects various vehicle data onto a car's windshield and to efforts to replace windshields with transparent displays.

Accordingly, it has become important to develop a cleaning technology that allows efficient removal of foreign objects such as raindrops and dust occurring on a windshield, or a transparent display that will replace it.

Currently, most cars typically use wipers to remove contaminants. However, the back-and-forth motion of the wiper blades across the windshield glass not only keeps blocking the driver's vision, but it only allows a limited area to be wiped as the blades move in an arc. Additionally, since old wiper blades cause friction-induced noise and a decline in wiping performance, wipers have to be replaced periodically.

In addition, devices like cameras are exposed to the external environment. Therefore, when it rains or when water gets on a camera, a water droplet ends up adhering to the camera surface. Such an event inevitably causes a significant deterioration in the camera's performance because the camera has no specific feature in place to remove said droplet.

Furthermore, for a small camera to maintain a clear view, a droplet occurring on the lens surface should be immediately removed, but continuous operation of the camera's cleaning system for said purpose can result in not only unnecessary energy use but also the system's shortened service life. Therefore, cleaning systems used in small cameras require a droplet detection technology that only operates when a droplet occurring on the lens surface is detected.

DETAILED DESCRIPTION OF THE INVENTION

Technical Problem

It is therefore an object of the present invention to solve the above-described problem by providing a technology for removing droplets, dust or frost forming on glass used in vehicles or cameras by applying the electrowetting-on-dielectric technique.

It is another object of the present invention to provide a camera droplet detection apparatus and method for detecting droplets occurring on camera cover glass surfaces using the impedance of the camera cover glass or an image photographed by the camera.

It is still another object of the present invention to provide a cleaning apparatus and method for removing conductive droplets forming on surfaces using the principle of electrowetting-on-dielectric and for removing non-conductive droplets forming on surfaces using the principle of dielectrophoresis.

Solution to Problem

In order to solve the above-described problems, according to one embodiment of the present invention, the cleaning apparatus comprises glass; multiple electrodes placed in series on top of said glass; a dielectric layer stacked on top of said electrodes; and a hydrophobic layer stacked on top of said dielectric layer and on whose surface a droplet forms. Here, through the application of differing direct current voltages to several of said electrodes, said droplet moves towards the outer edge of said glass.

According to another embodiment of the invention, the cleaning apparatus comprises glass; multiple electrodes placed in series on top of said glass; a dielectric layer stacked on top of said electrodes; and a hydrophobic layer stacked on top of said dielectric layer and on whose surface a droplet forms. Here, by the application of an alternating current voltage to said electrodes, said droplet moves towards the outer edge of said glass.

According to another embodiment of the invention, the cleaning apparatus comprises an underlying layer; and electrodes placed on top of said underlying layer. Here, the surface of said cleaning apparatus is tilted in the direction of gravity and, when a certain voltage is applied to said electrodes, a droplet adhering to the surface of said cleaning apparatus starts oscillating. When said droplet oscillates and moves in the direction of gravity, the droplet gets removed by said cleaning apparatus.

According to another embodiment of the invention, the cleaning apparatus comprises an oscillation part that causes a droplet adhering to the surface of said cleaning apparatus to oscillate and thereby reduces the force of adhesion between said droplet and the surface of said cleaning apparatus; and a control part that controls the operation of said oscillation part. Here, the surface of said cleaning apparatus is tilted in the direction of gravity and, when said droplet oscillates and moves in the direction of gravity, the droplet gets removed by said cleaning apparatus.

According to another embodiment of the invention, the cleaning apparatus comprises an oscillation part that causes a droplet adhering to the surface of said cleaning apparatus to oscillate and thereby reduces the force of adhesion between said droplet and the surface of said cleaning apparatus, and said oscillation part has a certain pattern. Here, the surface of said cleaning apparatus is tilted in the direction of gravity, and because said pattern is oriented in the same direction as the moving direction of said droplet, the droplet moves in said former direction.

According to another embodiment of the invention, the cleaning apparatus comprises an oscillation part that causes a droplet adhering to the surface of said cleaning apparatus to oscillate and thereby reduces the force of adhesion between said droplet and the surface of said cleaning apparatus. Here, the surface of said cleaning apparatus has a structure that allows a variation in the contact angle of said droplet in its moving direction and in the direction opposite to said moving direction to be greater than a contact angle variation of said droplet in other directions when said droplet oscillates and starts to move.

According to another embodiment of the invention, the cleaning apparatus comprises an underlying layer; and electrodes placed on top of said underlying layer and which has at least one sub-electrode. Here, since said sub-electrode has a comb pattern and the surface of said cleaning apparatus is tilted in the direction of gravity, when a certain voltage is applied to said sub-electrode, a droplet adhering to the surface of said cleaning apparatus moves in said direction of gravity, enabling said droplet, or at least either dust or frost to be removed by said cleaning apparatus.

According to another embodiment of the invention, the cleaning apparatus comprises an underlying layer; first and second electrodes placed on top of said underlying layer and physically separated, in which said first electrode has at least one first sub-electrode while said second electrode has at least one second sub-electrode. Here, said first sub-electrode has a comb pattern, said second sub-electrode has a comb pattern, and said sub-electrodes are placed in a crisscross pattern.

According to another embodiment of the invention, the cleaning apparatus comprises first sub-electrodes; and second sub-electrodes that are crisscrossed with said first sub-electrodes. Here, the first voltage, a positive voltage, is applied to all of said first sub-electrodes and the second voltage smaller than said first voltage is applied to all of said second sub-electrodes. By application of said voltages, a droplet on the surface of said cleaning apparatus moves in the direction of gravity. When said droplet moves, a variation in the contact angle of said droplet in both its moving direction and the direction opposite to said moving direction is greater than a contact angle variation of the droplet in other directions.

According to another embodiment of the invention, the cleaning apparatus comprises first sub-electrodes; and second sub-electrodes that are crisscrossed with said first sub-electrodes, and the first voltage, a positive voltage, is applied to all of said first sub-electrodes and the second voltage, which is smaller than said first voltage, is applied to all of said second sub-electrodes, and subsequently, said first voltage is applied to another one of first sub-electrodes while said second voltage is applied to another one of second sub-electrodes. Here, all sub-electrodes other than those sub-electrodes to which said first voltage and said second voltage are applied become inactive. By application of said voltages, a droplet on the surface of said cleaning apparatus moves in the direction in which said first voltage has been applied. When said droplet moves, a variation in the contact angle of said droplet in its moving direction is greater than a contact angle variation of the droplet in the direction opposite to said moving direction.

According to another embodiment of the invention, the cleaning structure comprises an underlying layer; and electrodes placed on top of said underlying layer. Here, as a certain voltage is applied at said voltage, a droplet adhering to the surface of said cleaning structure starts oscillating. When said droplet oscillates and moves in the direction of gravity, the droplet gets removed by said cleaning structure.

According to another embodiment of the invention, the cleaning structure comprises an underlying layer; first electrode and second electrode placed on top of said underlying layer; and a droplet support layer placed on top of said electrodes. Here, said first electrode and said second electrode are physically separated and placed in a crisscross pattern.

According to another embodiment of the invention, the cleaning structure comprises an underlying layer; electrodes placed on top of said underlying layer; and a droplet support layer placed on top of said electrodes. Here, said electrodes have a pattern structure that allows a variation in the contact angle of said droplet in its moving direction to be different from a contact angle variation of said droplet in other directions, when said droplet on said droplet support layer oscillates and starts to move.

According to another embodiment of the invention, the cleaning structure comprises an underlying layer; electrodes placed on top of said underlying layer; and a droplet support layer placed on top of said electrodes. Here, when a droplet on said droplet support layer moves, it moves in the same direction as the one in which said electrodes or said droplet support layer are oriented.

According to another embodiment of the invention, the cleaning structure comprises an underlying layer; first electrode and second electrode placed on top of said underlying layer; and a droplet support layer placed on top of said electrodes, in which said first electrode has at least one first sub-electrode while said second electrode has at least one second sub-electrode. Here, said first sub-electrodes and said second sub-electrodes are physically separated and placed in a crisscross pattern, in which said first sub-electrodes are physically separated from one another while said second sub-electrodes are physically separated from one another.

According to one embodiment of the invention, a droplet detection apparatus for detecting droplets on a camera comprises a camera part consisting of a camera module for photographing images and camera cover glass covering the lens of said camera module; an impedance measurement part for measuring the impedance of said camera cover glass; and a control part for detecting said droplet occurring on said camera cover glass using said impedance measurement.

According to one embodiment of the invention, a droplet detection apparatus for detecting droplets on a camera comprises an impedance measurement part for measuring the impedance of glass; and a control part for detecting said droplet occurring on said glass using said impedance measurement.

According to another embodiment of the invention, the cleaning apparatus comprises a substrate; at least one electrode placed on said substrate; a voltage application part for applying a high-frequency alternating-current voltage based on the reference frequency pre-set to said electrodes; and a switching part for switching on/off said high-frequency alternating current voltage to a lower frequency than said reference frequency. Here, both conductive and non-conductive droplets can be removed by means of said switching.

According to another embodiment of the invention, the cleaning apparatus comprises a substrate; at least one electrode placed on said substrate; a frequency generating part that applies a certain voltage to said electrodes but controls all frequencies both higher and lower than the reference frequency so that they occur all at once within a single period. Here, both conductive and non-conductive droplets can be removed by the application of said high-frequency and low-frequency voltages.

According to one embodiment of the invention, the method of cleaning glass for the cleaning apparatus comprising windshield glass (substrate), multiple electrodes placed in series on top of said glass, a dielectric layer stacked on top of said electrodes, and a hydrophobic layer stacked on top of said dielectric layer and on whose surface a droplet forms, and a direct current voltage application part for applying DC voltages to said respective electrodes comprises the step of receiving a droplet removal request signal; the step of applying direct current voltages, ground and high, alternately to said respective electrodes in sequential order at preset intervals according to said input droplet removal request signal; and the step of stopping application of said DC voltages either when a preset time elapses or when a droplet removal cancel request signal is entered. Here, said droplet moves towards the outer edge of said glass by application of differing DC voltages to several of said electrodes.

According to another embodiment of the invention, the method of cleaning glass for the cleaning apparatus comprising windshield glass (substrate), multiple electrodes placed in series on top of said glass, a dielectric layer stacked on top of said electrodes, and a hydrophobic layer stacked on top of said dielectric layer and on whose surface a droplet forms, and an alternating current voltage application part for applying an AC voltage to said respective electrodes comprises the step of receiving a droplet removal request signal; the step of applying an AC voltage to said respective electrodes according to said input droplet removal request signal; and the step of stopping application of said AC voltage either when a preset time elapses or when a droplet removal cancel request signal is entered. Here, said droplet moves towards the outer edge of said glass by application of alternating current voltage to said electrodes.

According to one embodiment of the invention, the droplet removal method comprises the step of oscillating a droplet adhering to the surface of the cleaning apparatus by applying a certain voltage to the electrodes according to a user command; and the step of oscillating and moving said droplet in the direction of gravity. Here, the surface of said cleaning apparatus is tilted in the direction of gravity, and a variation in the contact angle of said droplet in its moving direction and in the direction opposite to said moving direction is greater than a contact angle variation of the droplet in other directions, when said droplet oscillates and starts to move.

According to one embodiment of the invention, the method of droplet detection performed by the droplet detection apparatus comprising a cover glass layer; multiple transparent electrodes placed in series on top of said cover glass layer, and a hydrophobic and dielectric layer stacked on top of said transparent electrodes and on whose surface a droplet forms, comprises the step of measuring the impedance of said multiple transparent electrodes; the step of determining if said measured impedance changes; the step of deciding a droplet has been detected if said measured impedance changes; and the step of removing said droplet by applying a voltage to said transparent electrodes as said droplet has been detected.

According to another embodiment of the invention, the method of camera droplet detection performed by the camera droplet detection apparatus comprising a cover glass layer that covers the lens of the camera module; multiple transparent electrodes placed in series on top of said cover glass layer, and a hydrophobic and dielectric layer stacked on top of said transparent electrodes and on whose surface a droplet forms, comprises the step of photographing an image through said cameral module; the step of analyzing said photographed image; the step of deciding said droplet has been detected if the result of said analysis finds said image to have any distortion in a certain round shape; and the step of removing said droplet by applying a voltage to said transparent electrodes as said droplet has been detected.

According to one embodiment of the invention, the method of cleaning performed by the cleaning apparatus comprising a substrate and at least one electrode placed on said substrate comprises the step of receiving a droplet removal request signal; the step of applying an alternating current voltage at a higher frequency than the reference frequency preset for said electrodes; the step of switching on/off said applied high-frequency AC voltage to a lower frequency than said reference frequency, and the step of stopping application of said high-frequency AC voltage and said on/off switching either when a preset time elapses or when a droplet removal cancel request signal is entered. Here, both conductive and non-conductive droplets can be removed by means of said switching.

According to one embodiment, the invention provides a smart self-cleaning glass for automobiles which can quickly and effectively remove contaminants such as raindrops, dust, and frost occurring on a car's windshield glass.

Furthermore, in said cleaning apparatus, since the orientation of the electrodes is identical to the direction in which said droplet moves, the apparatus can speed up removal of said droplet and lower the voltage applied to said electrodes.

Moreover, by eliminating the need for periodic replacement of the cleaning apparatus (structure), it can significantly lower the risk of accident.

Moreover, the apparatus can not only help the driver drive safely by ensuring a clear vision even in adverse weather conditions, but it can also contribute to a car's fuel efficiency by reducing the car's weight and air resistance.

According to a preferred embodiment of the invention, the camera droplet detection apparatus and method can detect droplets occurring on the camera cover glass surface using the impedance of the camera cover glass or using images taken by the camera.

According to a preferred embodiment of the invention, the cleaning apparatus and method can remove not only conductive droplets forming on the surface but also non-conductive droplets using the principles of electrowetting-on-dielectric and dielectrophoresis.

Furthermore, an advantage of the invention is to provide fast response and reduced energy consumption by applying the electrowetting-on-dielectric and dielectrophoresis techniques, which allows the apparatus to be applied or used in a wide range of areas, including car windshields and internet of things image sensors, as well as small cameras for automotive and mobile applications.

BRIEF DESCRIPTION OF DRAWINGS

FIG. 1 is a view showing the structure of the car glass cleaning apparatus according to one embodiment of the invention.

FIGS. 2 and 3 are views showing the structure of the car glass cleaning apparatus according to one embodiment of the invention.

FIG. 4 is a flow chart showing the process of car glass cleaning according to one embodiment of the invention.

FIG. 5 is a flow chart showing the process of car glass cleaning according to another embodiment of the invention.

FIG. 6 is a view showing the process of actual cleaning by the car glass cleaning apparatus according to another embodiment of the invention.

FIG. 7 is a scene in which the car cleaning apparatus is actually used according to a preferred embodiment of the invention.

FIG. 8 is a view showing the process of droplet removal by the cleaning apparatus according to one embodiment of the invention.

FIG. 9 is a view schematically showing the structure of the cleaning apparatus according to one embodiment of the invention.

FIG. 10 is a view showing a pattern of electrodes according to one embodiment of the invention.

FIG. 11 is a view showing the flow of a droplet when the droplet is removed according to one embodiment of the invention.

FIG. 12 is a view showing a variation in the contact angle of a droplet when the droplet is removed according to one embodiment of the invention.

FIG. 13 is a view showing the results of a droplet removal experiment.

FIG. 14 is a view schematically showing the electrodes of the cleaning apparatus according to another embodiment of the invention.

FIG. 15 is a view showing the process of droplet removal by the cleaning apparatus according to one embodiment of the invention.

FIG. 16 is a view showing the pattern of electrodes according to one embodiment of the invention.

FIG. 17 is a view showing the flow of a droplet when the droplet is removed according to one embodiment of the invention.

FIG. 18 is a view showing a variation in the contact angle of a droplet when the droplet is removed according to one embodiment of the invention.

FIG. 19 is a view showing the flow of a droplet when the droplet is removed according to another embodiment of the invention.

FIG. 20 and FIG. 21 are views showing the results of a droplet removal experiment.

FIG. 22 is a view schematically illustrating the structure of the camera droplet detection apparatus according to a preferred embodiment of the invention.

FIG. 23 is a view illustrating a variation in the impedance of the camera cover glass depending on the presence of a droplet.

FIG. 24 is a view showing an example of an image photographed when a droplet occurs on the camera cover glass.

FIG. 25 is a flow chart showing the camera droplet detection method according to a preferred embodiment of the invention.

FIG. 26 is a flow chart showing the camera droplet detection method according to another embodiment of the invention.

FIG. 27 is a view showing the cleaning apparatus according to a preferred embodiment of the invention.

FIG. 28 is a view showing the pattern of the electrodes of the cleaning apparatus according to a preferred embodiment of the invention.

FIG. 29 is a view schematically illustrating the structure of the cleaning apparatus according to a preferred embodiment of the invention.

FIG. 30 to FIG. 33 are views explaining the cleaning apparatus according to a preferred embodiment of the invention.

FIG. 34 is a flow chart showing the cleaning method according to a preferred embodiment of the invention.

PREFERRED EMBODIMENT OF THE INVENTION

In the specification and the appended claims, the singular forms also include the plural unless the context clearly dictates otherwise. In the specification, the terms "comprising" and "consisting of" are not to be interpreted as essentially including all the elements or steps listed in the specification but should be interpreted as probably including some of the elements or steps or as further including additional elements or steps. Furthermore, the term "part" or "module" as used in the specification means a unit which performs at least one function or operation and which can be implemented in hardware, software or a combination thereof.

The present invention relates to a cleaning apparatus for self-cleaning droplets like raindrops and fog, as well as dust and frost and a droplet removal method thereof. Said cleaning apparatus can be either a standalone device or a device combined with another device.

According to one embodiment, said cleaning apparatus can be an apparatus including external glass, for instance, a car camera, digital camera, mobile camera, or Internet-of-Things (IoT) image sensor. Of course, said cleaning apparatus is not limited to cameras but includes all devices which require droplets to be removed.

According to another embodiment, said cleaning structure can correspond to a car's windshield.

Of course, said cleaning structure is not limited to cameras and car windshields but various modifications can be made insofar as said structure can remove droplets.

Such a cleaning apparatus is exposed to the external environment, resulting in the adhesion of droplets such as raindrops to the surface of the cleaning apparatus.

Previously, no conventional method can remove raindrops once those raindrops get stuck on glass surfaces, such as those of cameras, inevitably leading to performance degradation in the camera. For cars that control certain features using camera images, in particular, the degradation of image quality due to droplets can cause car accidents.

Furthermore, in conventional methods, since raindrops stuck on car windshield glass got removed using wipers, delayed replacement of wipers could increase the risk of accidents.

Therefore, droplets should be removed immediately after said droplets get stuck on surfaces, and the present invention provides a cleaning apparatus which can remove droplets immediately after such droplets adhere to surfaces.

Furthermore, the invention becomes a technology, which can substitute for wipers without replacing said wipers, by removing droplets immediately after said droplets adhere to a surface. The present invention provides a cleaning structure which can remove droplets immediately after said droplets adhere to a surface while lowering the risk of accidents.

According to one embodiment, said cleaning apparatus uses the electrowetting technique to remove droplets, dust, or frost. In particular, said cleaning apparatus can remove droplets, dust or frost on surfaces by applying a certain voltage to the electrodes. Here, the methods of applying the above-described voltage include an alternating current method in which a certain voltage is applied to all the electrodes, and a direct current method in which a certain voltage is applied to the electrodes in sequential order.

Viewed from another perspective, said cleaning apparatus can remove a droplet by causing an oscillation on a surface. An oscillation occurring on the surface of said cleaning apparatus reduces the force of adhesion between said droplet and said surface, allowing said droplet to move in the direction of gravity to be removed. For example, the surface of a cleaning apparatus featured on a car camera is tilted in the direction of gravity, which means that, if the force of adhesion between said droplet and surface weakens, said droplet will move in the direction of gravity, resulting in said droplet being separated from said cleaning apparatus and then removed.

Viewed from the perspective of vehicle control, a raindrop can adhere to the camera surface when it rains. When the driver enters a rain removal command (droplet removal command), the control part (not shown) can control said raindrop by applying a certain voltage to the electrodes placed on said camera surface. Said voltage can be supplied, for instance, from car battery to said camera. Meanwhile, said control part may be one of the car's ECUs (electronic control unit).

The following is a detailed description of the various embodiments of the invention with reference to the accompanying drawings. It is, however, to be understood that the object to be removed includes only droplets as a matter of convenience and is in no way limited to droplets, but dust and frost, in addition to droplets (including micro droplets) can be also removed.

FIG. 1 is a view showing the structure of the car glass cleaning apparatus according to one embodiment of the invention.

According to one embodiment of the invention, the car glass cleaning apparatus (100) can be applied to car windshields as shown in FIG. 1.

The car glass cleaning apparatus (100) features a patterned structure of multiple electrodes separate from one another on top of a microchip manufactured through the MEMS process.

In one embodiment of car glass cleaning, the car glass cleaning apparatus (100) can change the surface tension of a droplet by applying differing direct current voltages (high and ground) alternately to the respective electrodes.

As shown in FIG. 1, said droplet will move from an electrode to which a ground voltage has been applied, to an electrode to which a high voltage has been applied (i.e., towards the outer edge of the windshield).

In another embodiment of car glass cleaning, the car glass cleaning apparatus (100) can change the surface tension of a droplet by causing the droplet to oscillate by application of a low-frequency alternating current voltage to the electrodes.

Since the windshield has some degree of slope relative to the flat surface, a droplet will move downwards while oscillating (i.e., towards the outer edge of the windshield).

The following is a description of the structure of the car glass cleaning apparatus (100) with reference to FIG. 2 and FIG. 3.

FIGS. 2 and 3 are views showing the structure of the car glass cleaning apparatus according to one embodiment of the invention.

The car glass cleaning apparatus (100) can comprise windshield glass (substrate) (110), electrodes (120), a dielectric layer (130), a hydrophobic layer (140), and a direct current voltage application part (150).

The windshield (110) is the bottommost layer of the car glass cleaning apparatus (100) and serves as a substrate for the car glass cleaning apparatus (100).

Meanwhile, the electrodes (120) are transparent electrodes and can form a certain pattern as they are placed in series on top of the windshield (110).

Here, the electrodes (120) can form a straight line, a stream line, or a hook shape and there is no limit to what type of pattern can be formed by the multiple electrodes (120).

Meanwhile, as shown in FIG. 2 and FIG. 3, the dielectric layer (130) can be placed on top of the electrodes (120) and fill the gaps between the respective electrodes (120).

For reference, the dielectric layer (130) can contain more than one type of substance selected from a group consisting of parylene C, teflon, and metal oxides.

Meanwhile, the hydrophobic layer (140) is the uppermost layer of the car glass cleaning apparatus (100), has a droplet form on its surface, and can consist of a fluid like water and a substance with low hydrophilicity.

Therefore, the droplet can move smoothly on the surface of the hydrophobic layer (140).

Meanwhile, the direct current voltage application part (150) can apply direct current voltages, ground and high, alternately to the respective electrodes (120) in sequential order at preset intervals.

Then the droplet will move on the surface of the hydrophobic layer (140) from an electrode to which a ground voltage has been applied to an electrode to which a high voltage has been applied, ultimately moving to the outermost edge of the hydrophobic layer (140) and enabling the windshield (110) to be cleaned.

In another embodiment of the car glass cleaning apparatus (100), as shown in FIG. 3, the car glass cleaning apparatus (100) can comprise cover glass (110), electrodes (120), a dielectric layer (130), a hydrophobic layer (140), and an alternating current voltage application part (160).

In other words, in the car glass cleaning apparatus (100) of another embodiment, the cover glass (110), electrodes (120), dielectric layer (130) and hydrophobic layer (140) all remain the same, with the direct current voltage application part (150) replaced by the alternating current voltage application part (160).

The alternating current voltage application part (160) can apply an AC voltage to the electrodes (120) and a droplet forming on the surface of the hydrophobic layer (140) oscillates when the AC voltage is applied to the electrodes (120).

Then by the slope of the windshield (110), the droplet moves along the slope towards the outer edge of the hydrophobic layer (140), enabling the windshield (110) to be cleaned.

In another embodiment of the car glass cleaning apparatus (100), the car glass cleaning apparatus (100) can comprise cover glass (110), electrodes (120), a dielectric layer (130), a hydrophobic layer (140), a DC voltage application part (150), an AC voltage application part (160), and a voltage mode setting part (not shown).

In other words, in the car glass cleaning apparatus (100) of another embodiment, the cover glass (110), electrodes (120), dielectric layer (130), hydrophobic layer (140), DC voltage application part (150), and AC voltage application part (160) all remain the same, with the voltage mode setting part added.

Depending on the setup of the windshield, the voltage mode setting part (not shown) allows a voltage to be applied to the electrodes (120) when the user uses either the DC voltage application part (150) or the AC voltage application part (not shown), depending on the user's choice between removing the droplet by applying a DC voltage to the electrodes (120) on one hand, and removing said droplet by oscillation after applying an AC voltage on the other.

FIG. 4 is a flow chart showing the process of car glass cleaning according to one embodiment of the invention, and FIG. 5 is a flow chart showing the process of car glass cleaning according to another embodiment of the invention FIG. 4 and FIG. 5 represent the car glass cleaning apparatus (100) as coupled to an electronic system in the car that can be manipulated by the driver, and the following describes the flow charts of FIG. 4 and FIG. 5, with the car glass cleaning apparatus (100) shown in FIG. 2 and FIG. 3 as subject-matter.

The car glass cleaning apparatus (100) receives a droplet removal request signal through the electronic system manipulated by the driver (S410, S510).

Following S410, the car glass cleaning apparatus (100) applies DC voltages, ground and high, alternately to the respective electrodes (120) in sequential order at preset intervals according to said input droplet removal request signal (S420).

Then a droplet forming on the surface of the hydrophobic layer (140) moves towards the outer edge of the hydrophobic layer (140) by the DC voltages applied, ground and then high alternately, enabling the windshield (110) to be cleaned.

In another embodiment, as shown in FIG. 5, following S510, when an AC voltage is applied to the electrodes (120) at S520, a droplet forming on the surface of the hydrophobic layer (140) starts oscillating by the applied AC voltage and moves towards the outer edge of the hydrophobic layer (140) along the slope of the windshield (110), enabling the windshield (110) to be cleaned.

Following s420 or s520, when a preset time elapses or when a droplet removal cancel request signal is entered by the driver, the car glass cleaning apparatus (100) stops applying either the DC voltage or the AC voltage to the respective electrodes (S430, S530).

FIG. 6 is a view showing the actual cleaning process of the car glass cleaning apparatus according to another embodiment of the invention. In other words, FIG. 6 shows the cleaning apparatus (100) of the lens part removing dust and frost occurring on the windshield (110).

Referring to FIG. 6, in a preferred embodiment of the invention, the car glass cleaning apparatus (100) can cause a droplet to roll off or move on a surface on which dust is stuck. Since the droplet adsorbs surrounding dust as it moves, the apparatus can remove the dust stuck on the surface while at the same time removing the droplet.

Furthermore, in a preferred embodiment, heat occurs on the electrodes (120) of the car glass cleaning apparatus (100) under the same mechanism as the one for the hot wire of an insulator, which allows frost occurring on the surface to be removed.

FIG. 7 is a scene in which the car cleaning apparatus is actually used according to a preferred embodiment of the invention.

Respective droplets as large as 1 µl, 3 µl, and 5 µl have formed on the surface of the hydrophobic layer (140).

For reference, the multiple electrodes (120) are transparent electrodes.

In the state of (a), when ground and high DC voltages are applied alternately in sequential order at preset intervals or when an AC voltage is applied, the respective droplets start moving downwards as shown in (b) and (c), ultimately enabling the surface to be cleaned as shown in (d). Of course, as shown in FIG. 7, fine particles may remain.

FIG. 8 is a view showing the droplet removal process of the cleaning apparatus according to one embodiment of the invention, and FIG. 9 is a view schematically showing the structure of the cleaning apparatus according to one embodiment of the invention. FIG. 10 is a view showing the pattern of electrodes according to one embodiment of the invention, and FIG. 11 is a view showing the flow of a droplet when the droplet is removed according to one embodiment of the invention. FIG. 12 is a view showing a variation in the contact angle of a droplet when the droplet is removed according to one embodiment of the invention, and FIG. 13 is a view showing the result of a droplet removal experiment.

(A) in FIG. 8 shows a change in the camera surface on the cleaning apparatus of the present invention, while (B) in FIG. 8 shows the movement of a droplet on the glass structure of the invention.

As shown in (A) of FIG. 8, when a certain voltage is applied to the electrodes when a droplet gets stuck on the camera surface, then, as shown in the right image, the droplet in the cleaning area of the camera surface gets removed, subsequently making the cleaning area clear. Here, said cleaning area is required before a photograph is taken and corresponds to the lens part.

As shown in (B) of FIG. 8, when a certain voltage is applied to the electrodes when a droplet gets stuck on the surface of the glass structure, a droplet such as a raindrop starts moving in the direction of gravity along the slope of the glass structure. Consequently, the droplet gets removed.

In particular, since the glass structure of the invention utilizes the electrowetting-on-dielectric technique, said droplet can be quickly removed because the electrowetting-on-dielectric technique characteristically provides fast response.

The cleaning apparatus for removing such droplets as described above, particularly the part of said cleaning apparatus corresponding to the cleaning area, can have the structure as shown in FIG. 9.

Referring to FIG. 9, the cleaning apparatus of the present embodiment can comprise an underlying layer (900), electrodes (902), a dielectric layer (904), and a hydrophobic layer (906).

The underlying layer (900) can be cover glass that protects said cleaning apparatus from external contamination and shock and can be placed on, for example, a lens part (not shown).

According to one embodiment, the underlying layer (900) can be non-wettable glass.

The electrodes (902) can be, for instance, transparent electrodes consisting of ITO and can be placed on top of the underlying layer (900) with a certain pattern.

According to one embodiment, as shown in FIG. 10, the electrodes (902) can comprise a first electrode (1000) with a comb structure and a second electrode (1002) with a comb structure.

The first electrode (1000) can comprise a first underlying pattern (1010) and at least one first branch pattern (1012).

A portion of the first underlying pattern (1010) is electrically connected to a power source (908) or ground, and a certain voltage is applied to the first underlying pattern (1010) by said power source or said ground. Meanwhile, the power source (908) can be located inside the cleaning apparatus or outside of it.

The first branch patterns (1012) are formed as lengthwise extensions from the first underlying pattern (1010) in the direction in which they are crisscrossed with, or preferably perpendicular to, the first underlying pattern (1010). Consequently, when a certain voltage is applied to the first underlying pattern (1010), that certain voltage will be supplied to the first branch patterns (1012) as well.

According to one embodiment, first branch patterns (1012) extend from the first underlying pattern (1010), and the first branch patterns (1012) may have equal intervals (gaps) in between. Of course, insofar as first branch patterns (1012) are crisscrossed with second branch patterns (1020), some of the gaps among the first branch patterns (1012) may differ.

The second electrode (1002) can comprise a second underlying pattern (1022) and at least one second branch pattern (1020).

A portion of the second underlying pattern (1022) is electrically connected to the power source (908) or ground, and a certain voltage is applied to the first underlying pattern (1010) by said power source (908) or said ground.

The second branch patterns (1020) are formed as lengthwise extensions from the second underlying pattern (1022) in the direction in which they are crisscrossed with, or preferably perpendicular to, the second underlying pattern (1022). Consequently, when a certain voltage is applied to the second underlying pattern (1022), that certain voltage will be supplied to the second branch patterns (1020) as well.

Furthermore, as shown in FIG. 10, the second branch patterns (1020) are crisscrossed with the first branch patterns (1012). However, the first branch patterns (1012) and said second branch patterns (1020) can be physically separated.

According to one embodiment, second branch patterns (1020) extend from the second underlying pattern (1022) and the second branch patterns (1020) may have equal gaps in between. Of course, insofar as first branch patterns (1012) are crisscrossed with second branch patterns (1020), some of the gaps among the second branch patterns (1020) may differ.

Meanwhile, in order to cause an oscillation on the surface of the cleaning apparatus, a first voltage is applied to either the first electrode (1000) or the second electrode (1002) and a second voltage lower than said first voltage can be applied to the other. Here, the first voltage is a positive voltage and said second voltage can be a ground voltage.

Referring to FIG. 9 again, the dielectric layer (904) is placed on top of the electrodes (902) and can fill the gaps between the electrodes (1000 and 1002).

According to one embodiment, the dielectric layer (904) can contain more than one type of substance selected from a group consisting of parylene C, teflon, and metal oxides.

The hydrophobic layer (906) is formed on top of the dielectric layer (904) and can consist of a fluid like water and a substance with low hydrophilicity. Consequently, a droplet can easily move on the surface of the hydrophobic layer (906).

The following describes the cleaning operation performed by the cleaning apparatus having the above-described structure.

For example, when the user enters a droplet removal command, the power supply (908), as controlled by the control part, applies a first voltage to either of the electrodes (100 and 1002) and then applies a second voltage lower than said first voltage to the other electrode. Consequently, a droplet adhering to the surface of said cleaning apparatus oscillates.

Said oscillation on the surface of said cleaning apparatus decreases the force of adhesion between said surface and the droplet. In this case, since the surface of said cleaning apparatus is tilted in the direction of gravity, the droplet adhering to said surface slides in the direction of gravity, as shown in FIG. 11, and ends up departing from said cleaning apparatus. In other words, said droplet gets removed by said cleaning apparatus.

Particularly, since the cleaning apparatus in the present embodiment uses the electrowetting-on-dielectric technique, it ensures fast droplet removal and efficiency.

According to one embodiment, a variation in contact angle in an oscillating droplet's moving direction and the direction opposite to said moving direction can be different from contact angle variations in other directions. Such a difference can be useful in causing the droplet to slide. Furthermore, a difference in said contact angle variation can also cause said droplet to slide in the direction of gravity and get removed despite the low slope of the surface of said cleaning apparatus.

According to another embodiment, the electrodes (1000 and 1002) have a comb pattern and the branch patterns (1012 and 1020) can be oriented in the direction of gravity. Consequently, as shown in FIG. 12, when a droplet oscillates by application of a certain voltage, the orientation of the branch patterns (1012 and 1020) increases the contact angle variation of the droplet.

In other words, the direction in which the droplet slides is identical or similar to the direction in which the electrodes (1000 and 1002) are oriented, thereby enabling the droplet to slide more easily when said droplet oscillates. Therefore, even if a far lower voltage is applied to the electrodes (1000 and 1002), said droplet can be easily removed.

Viewed from another perspective, if the cleaning apparatus is implemented in such a way that a contact angle variation of a droplet is greater in the direction in which the droplet slides, namely, the direction of gravity, than a contact angle variation in any other direction, then said droplet can be easily removed.

The following examines the results of an actual experiment.

The results of an experiment, wherein an ordinary camera and a camera to which the cleaning apparatus of the present invention was applied were mounted on an actual car and the car was driven on a rainy day, revealed that, as shown in (A) of FIG. 13, the droplet (raindrop) was removed from the surface of the camera to which the cleaning apparatus was applied, enabling the image to be photographed far more clearly.

Furthermore, the results of an experiment, wherein an actual car used the glass structure herein described as its windshield on a rainy day, revealed that, as shown in (B) of FIG. 13, the droplet was perfectly removed from the windshield, making the windshield clear.

FIG. 14 is a view schematically showing the electrodes of the cleaning apparatus according to another embodiment of the invention. However, since the electrodes share the same structure despite their different orientations, only one electrode is shown. Of course, the branches of the electrodes can be arranged so that they are crisscrossed.

Referring to FIG. 14, one of the electrodes can comprise an underlying pattern (1400) and at least one branch pattern (1402).

The branch pattern (1402) can comprise a branch part (1410) and at least one protrusion (1412) protruding from the branch part (1410). In other words, unlike the branch pattern shown in FIG. 10, the branch pattern (902) in the present embodiment can include at least one protrusion (912). When such a protrusion (912) is created, it can widen the overall surface area of the electrode.

Of course, the branch patterns of the electrodes can be arranged in a crisscross pattern similar to the branch patterns shown in FIG. 10.

In addition to the cleaning apparatus in the above-described embodiments, various modifications can be made to the structure of the cleaning apparatus insofar as the cleaning apparatus thus implemented can remove droplets.

According to one embodiment, the cleaning apparatus can comprise an oscillation part that reduces the force of adhesion between a droplet adhering to the surface and the surface of said cleaning apparatus by making said droplet oscillate. Said oscillation part has a certain pattern. Furthermore, the surface of said cleaning apparatus is tilted in the direction of gravity, and because said pattern is oriented in the same direction as the moving direction of said droplet, the droplet moves in said former direction.

Of course, depending on said oscillation, a variation in the contact angle of the droplet in said moving direction and the direction opposite to said moving direction can be greater than a contact angle variation in any other direction.

According to another embodiment, the cleaning apparatus can comprise an oscillation part that reduces the force of adhesion between a droplet adhering to the surface and the surface of said cleaning apparatus by making said droplet oscillate. Here, the surface of said cleaning apparatus has a structure that allows a variation in the contact angle of said droplet in its moving direction and in the direction opposite to said moving direction to be greater than a contact angle variation of said droplet in other directions when said droplet oscillates and starts to move.

Meanwhile, said oscillation part comprises electrodes; however, said electrodes can be oriented in the same direction as the moving direction of said droplet.

According to another embodiment, the cleaning structure can comprise an underlying layer, first electrode and second electrode placed on top of said underlying layer, and a droplet support layer placed on top of said electrodes. Here, said droplet support layer can comprise a dielectric layer and a hydrophobic layer. Furthermore, said first electrode and said second electrode are physically separated and placed in a crisscross pattern.

According to another embodiment, the cleaning structure comprises an underlying layer, electrodes placed on said underlying layer and a droplet support layer placed on said electrodes. Here, said electrodes can have a pattern structure that allows a variation in the contact angle of said droplet in its moving direction when the droplet oscillates and moves on said droplet support layer to be different from a contact angle variation of said droplet in other directions.

According to another embodiment, the cleaning structure comprises an underlying layer, electrodes placed on top of said underlying layer and a droplet support layer placed on top of said electrodes. Here, when a droplet on said droplet support layer moves, it moves in the same direction as the one in which said electrodes or said droplet support layer are oriented.

FIG. 15 is a view showing the process of droplet removal by the cleaning apparatus according to one embodiment of the invention. FIG. 16 is a view showing the pattern of electrodes according to one embodiment of the invention, and FIG. 17 is a view showing the flow of a droplet when the droplet is removed according to one embodiment of the invention. FIG. 18 is a view showing a variation in the contact angle of a droplet when the droplet is removed according to one embodiment of the invention, and FIG. 19 is a view showing the flow of a droplet when the droplet is removed according to another embodiment of the invention. FIG. 20 and FIG. 21 are views showing the results of a droplet removal experiment.

FIG. 15 shows a change in the surface of the cleaning apparatus in the present invention. As shown in FIG. 15, after a droplet has adhered to the surface of the cleaning apparatus, when a certain voltage is applied to the electrodes, the droplet gets removed from the surface, making the surface clear, as shown in the right image.

The cleaning apparatus for removing such droplets as described above can have the structure as shown in FIG. 9. However, the electrode (902) structure is different from the structure of FIG. 10.

According to one embodiment, the electrodes (902) can comprise the first electrode (1600) and second electrode (1602) as shown in FIG. 16.

The first electrode (1600) comprises first sub-electrodes (1600a to 1600n) and the second electrode (1602) can also comprise second sub-electrodes (1602a to 1602n). Of course, the number of the first sub-electrodes (1600a to 1600n) is preferably the same as the number of the second sub-electrodes (1602a to 1602n), but they may differ.

The first sub-electrodes (1600a to 1600n) can each have a comb structure, and the second sub-electrodes (1602a to 1602n) can also each have a comb structure.

The first sub-electrodes (1600a to 1600n) are physically separated from one another, and the second sub-electrodes (1602a to 1602n) are also physically separated from one another. Furthermore, the first sub-electrodes (1600a to 1600n) and the second sub-electrodes (1602a to 1602n) are physically separated.

Viewed from the overall shape, the first electrode (1600) and the second electrode (1602) can each have a comb pattern.

The following describes the structures of the sub-electrodes (1600a to 1600n, and 1602a to 1602n) as represented by the first sub-electrode (1600a) and the second sub-electrode (1602a). Though not illustrated here, other sub-electrodes (1600b to 1600n, and 1602b to 1602n) have structures identical or similar to those of the other sub-electrodes (1600a, 1602a).

The first sub-electrode (1600a) can include a first underlying pattern (1610), a first input pattern (1612) and at least one first branch pattern (1614).

The first underlying pattern (1610) is connected to the first input pattern (1612) and performs the role of transferring a certain voltage supplied through the first input pattern (1612) to the first branch patterns (1614).

The first input pattern (1612) is electrically connected to either a power source (908) or ground. Consequently, a certain voltage is supplied to the first input pattern (1612). Meanwhile, the power source (908) can be located inside the cleaning apparatus or outside of it.

According to another embodiment, no first input pattern (1612) may exist, but a certain voltage can be supplied to a portion of the first underlying pattern (1610). Therefore, a portion of the first underlying pattern (1610) can have a structure electrically connected to the power source (908) or ground.

The first branch patterns (1614) are formed as lengthwise extensions from the first underlying pattern (1610) in the direction in which they are crisscrossed with, or preferably perpendicular to, the first underlying pattern (1610). Consequently, when a certain voltage is applied to the first underlying pattern (1610), that certain voltage will be supplied to the first branch patterns (1614) as well.

According to one embodiment, the first branch patterns (1614) extend from the first underlying pattern (1610), and the first branch patterns (1614) may have equal intervals (gaps) in between. Of course, insofar as first branch patterns (1614) are crisscrossed with second branch patterns (1624), some of the gaps among the first branch patterns (1614) may differ.

The second sub-electrode (1602a) can include a second underlying pattern (1620), a second input pattern (1622) and at least one second branch pattern (1624).

The second underlying pattern (1620) is connected to the second input pattern (1622) and performs the role of transferring a certain voltage supplied through the second input pattern (1622) to the second branch patterns (1624).

The second input pattern (1622) is electrically connected to either a power source (908) or ground. Consequently, a certain voltage is supplied to the second input pattern (1622).

According to another embodiment, no second input pattern (1622) may exist, but a certain voltage can be supplied to a portion of the second underlying pattern (1620). Therefore, a portion of the second underlying pattern (1620) can have a structure electrically connected to the power source (908) or ground.

The second branch patterns (1624) are formed as lengthwise extensions from the second underlying pattern (1620) in the direction in which they are crisscrossed with, or preferably perpendicular to, the second underlying pattern (1620). Consequently, when a certain voltage is applied to the second underlying pattern (1620), that certain voltage will be supplied to the second branch patterns (1624) as well.

Furthermore, as shown in FIG. 16, the second branch patterns (1624) are crisscrossed with the first branch patterns (1614). However, the first branch patterns (1614) and said second branch patterns (1624) can be physically separated.

According to one embodiment, the second branch patterns (1624) extend from the second underlying pattern (1620), and the second branch patterns (1624) may have equal gaps in between. Of course, insofar as first branch patterns (1614) are crisscrossed with second branch patterns (1624), some of the gaps among the second branch patterns (1624) may differ.

According to said crisscross, the second branch patterns (1624) that are physically separated can be arranged in between the first branch patterns (1614), and the first branch patterns (1614) that are physically separated can be arranged in between the second branch patterns (1624).

Meanwhile, in order to remove a droplet from the surface of the cleaning apparatus, a first voltage is applied to either the first electrode (1600a) or the second electrode (1602a) and a second voltage lower than said first voltage can be applied to the other. Here, the first voltage is a positive voltage and said second voltage can be a ground voltage.

Referring to FIG. 9 again, the dielectric layer (904) is placed on top of the electrodes (1600 and 1602) and can fill the gaps between the electrodes.

The following describes the cleaning operation performed by the cleaning apparatus having the above-described structure.

To begin with, below describes the cleaning operation performed using the alternating current method.

For example, when the user enters a droplet removal command, the power supply (908), as controlled by the control part, applies a first voltage to either of the electrodes (1600 and 1602) and then applies a second voltage lower than said first voltage to the other electrode. Consequently, a droplet adhering to the surface of said cleaning apparatus oscillates. Here, said first voltage is simultaneously applied to all of the sub-electrodes (1600a to 1600n) of the electrodes (1600), and said second voltage can be simultaneously applied to all of the sub-electrodes (1602a to 1602n).

An oscillation occurring on the surface of said cleaning apparatus reduces the force of adhesion between said droplet and said surface. Since the surface of said cleaning apparatus is tilted in the direction of gravity, the droplet adhering to said surface slides in the direction of gravity, as shown in FIG. 17, and ends up departing from said cleaning apparatus. In other words, said droplet gets removed by said cleaning apparatus.

Particularly, since the cleaning apparatus in the present embodiment uses the electrowetting-on-dielectric technique, it ensures fast droplet removal and efficiency.

According to one embodiment, a variation in contact angle in an oscillating droplet's moving direction and the direction opposite to said moving direction can be different from contact angle variations in other directions. Such a difference can be useful in causing the droplet to slide. Furthermore, a difference in said contact angle variation can also cause said droplet to slide in the direction of gravity and get removed despite the low slope of the surface of said cleaning apparatus.

According to another embodiment, the electrodes (1600 and 1602) have a comb pattern and the branch patterns (1612 and 1620) can be oriented in the direction of gravity. Consequently, as shown in FIG. 5, when a droplet oscillates by application of a certain voltage, the orientation of the branch patterns (1612 and 6020) increases the contact angle variation of the droplet.

In other words, the direction in which the droplet slides is identical or similar to the direction in which the electrodes (1600 and 1602) are oriented, thereby enabling the droplet to slide more easily when said droplet oscillates. Therefore, even if a far lower voltage is applied to the electrodes (1600 and 1602), said droplet can be easily removed.

Viewed from another perspective, if the cleaning apparatus is implemented in such a way that a contact angle variation of a droplet is greater in the direction in which the droplet slides, namely, the direction of gravity, than a contact angle variation in any other direction, then said droplet can be easily removed.

Next, below describes the cleaning operation performed using the direct current method.

The direct current method is a method by which a certain voltage is applied in sequential order to the sub-electrodes (1600a to 1600n, and 1602a to 1602n).

For example, a first voltage, a positive voltage, is applied to the sub-electrodes (1600a) and a second voltage lower than said first voltage is applied to the sub-electrodes (1602a) corresponding to the first sub-electrodes (1600a). Here, said second voltage can be a ground voltage and the other sub-electrodes (1600a to 1600n, and 1602b to 1602n) remain inactive. Consequently, the droplet placed on the sub-electrodes (1600a and 1602a) moves in the direction in which said first voltage has been applied.

Subsequently, the first voltage is applied to the sub-electrode (1600b) and the second voltage can be applied to the sub-electrode (1602b) corresponding to the sub-electrode (1600b). Here, the other sub-electrodes (1600a, 1600c to 1600*n*, and 1600*c* to 1602*n*) remain inactive. Consequently, the droplet placed on the sub-electrodes (1600*a* and 1602*a*) moves in the direction in which said first voltage has been applied.

The above-described sequential voltage application process is performed until the voltages are applied to the final sub-electrodes (1600*n* and 1602*n*), and this sequential voltage application process is shown in FIG. 6.

Following up to this is a repeatedly-performed process whereby the voltages are applied in sequential order to the sub-electrodes (1600*a* to 1600*n*, and 1602*a* to 1602*n*). Consequently, the droplet adhering to the surface of the cleaning apparatus can be easily removed.

Meanwhile, in the direct current method, a variation in the contact angle of a droplet in the droplet's moving direction can be greater than a contact angle variation in the direction opposite to said moving direction.

The following describes the results of an actual experiment. (a) of FIG. 20 represents the process of removing droplet and hydrophilic dust and (b) of FIG. 20 shows the process of removing droplet and hydrophobic dust.

The results of an experiment, wherein the cleaning apparatus of the present invention was mounted on an actual car and the car was driven on a rainy day, revealed that, as shown in (a) of FIG. 20, the droplet (raindrop) was removed from the cleaning apparatus, enabling the image to be photographed far more clearly. Particularly, as shown in (a) of FIG. 20, the results show that in addition to the droplet, dust was simultaneously removed.

Furthermore, the results of an experiment, wherein an actual car used the glass structure herein described as its windshield on a rainy day, revealed that, as shown in (b) of FIG. 20, the droplet was perfectly removed from the windshield, making the windshield clear. Particularly, in addition to the droplet, dust was simultaneously removed.

Moreover, as shown in FIG. 21, it was found that the frost that occurred on the surface of the cleaning apparatus was removed.

In addition to the cleaning apparatus in the above-described embodiments, various modifications can be made to the structure of the cleaning apparatus insofar as the cleaning apparatus thus implemented can remove droplets, dust, or frost.

According to one embodiment of the invention, the cleaning apparatus comprises an oscillation part that causes a droplet adhering to the surface to oscillate and thereby reduces the force of adhesion between said droplet and the surface of said cleaning apparatus. Said oscillation part has a certain pattern. Furthermore, the surface of said cleaning apparatus is tilted in the direction of gravity and, because said pattern is oriented in the same direction as the moving direction of said droplet, the droplet moves in said former direction.

FIG. 22 is a view schematically illustrating the structure of the camera droplet detection apparatus according to a preferred embodiment of the invention, FIG. 23 is a view illustrating a variation in the impedance of the camera cover glass depending on the presence of a droplet, and FIG. 24 is a view showing an example of an image photographed when a droplet occurs on the camera cover glass. The following describes the structure of the camera droplet detection apparatus according to an embodiment of the invention with reference to FIG. 22, but also with reference to FIG. 23 and FIG. 24.

To begin with, referring to FIG. 22, according to a preferred embodiment of the invention, the camera droplet detection apparatus comprises a camera part (10), an impedance measurement part (20), a control part (30), and a voltage application part (40).

The camera part (10) comprises a camera module (11) and camera cover glass (15) for covering the lens of the camera module (11).

The camera module (11) produces an image by photographing an object through the lens. For example, the camera module (11) can consist of a lens module, which is made up of elements made from a transparent material such as glass made either spherical or aspheric and produces an optical image by causing light rays to converge or diverge; an image sensor which converts the optical image thus produced into electrical signals; and a PCB comprising various circuits that process the electrical signals produced by the image sensor.

The camera cover glass (15) comprises a cover glass layer (16), transparent electrodes (17) and a hydrophobic and dielectric layer (18).

The cover glass layer (16) is the bottommost layer of the camera cover glass (15) and serves as a substrate for the camera cover glass (15) while also directly covering the lens of the camera module (11).

The transparent electrodes (17) are placed in series on top of the cover glass layer (16) and form a pre-set pattern. For example, the transparent electrodes (17) can form a straight line, a stream line, or a hook shape. There is no limit to what type of pattern can be formed by the multiple transparent electrodes (17).

The hydrophobic and dielectric layer (18) is the topmost layer of the camera cover glass (15) and, when stacked on top of the multiple transparent electrodes (17) as shown in FIG. 22, fill the gaps between the respective transparent electrodes (17).

For example, the hydrophobic and dielectric layer (18) can contain more than one type of substance selected from a group consisting of parylene C, teflon, and metal oxides.

Furthermore, a droplet forms on the surface of the hydrophobic and dielectric layer (18).

For example, the hydrophobic and dielectric layer (18) can consist of a fluid like water and a substance with low hydrophilicity and consequently, a droplet can easily move on the surface of the hydrophobic and dielectric layer (18).

The impedance measurement part (20) measures the impedance of the transparent electrodes (17). To that end, a micro voltage can be frequently applied to the transparent electrodes (17) by the voltage application part (40). For example, ground and high voltages, both direct-current voltages, can be applied at micro levels every two transparent electrodes (17).

The control part (30) determines whether a droplet has occurred on the camera cover glass (15) using the impedance of the transparent electrodes (17) measured by the impedance measurement part (20) or using images taken by the camera module (11).

In other words, the control part (40) checks the impedance of the transparent electrodes (17) measured by the impedance measurement part (20) and, if the impedance changes, decides that a droplet has occurred on the camera cover glass (15).

For example, referring to FIG. 23, as shown on the left side of FIG. 23, the transparent electrodes (17) and hydrophobic and dielectric layer (18) of the camera cover glass (15) can respectively have a resistance component and a capacitor component. Also, as shown on the right side of FIG. 23, a droplet occurring on the hydrophobic and dielectric layer (18) surface of the camera cover glass (15) can have a resistance component and a capacitor component. Therefore, when a droplet occurs on the hydrophobic and dielectric layer (18) surface of the camera cover glass (15), the impedance changes on the transparent electrodes (17) at a location where the droplet has occurred.

Furthermore, the control part (40) analyzes the image photographed by the camera module (11) and, if the analysis result finds the image to have any distortion in a certain round shape, can decide that a droplet has occurred on the camera cover glass (15). For example, as shown in FIG. 24, if many droplets occur on the camera cover glass (15), a photographed image can have distortions in certain round shapes.

Here, the control part (40) can inspect the image for the presence of round droplet forms or calculate the clarity of the image in order to decide if the image has a distortion in a certain round shape.

In other words, the control part (40) can decide that the image has distortions in certain round shape if many round droplet forms are detected, or if the clarity of the image falls short of the pre-set clarity standard.

Also, the control part (30) controls the voltage application part (40) in such a way that it applies a voltage to the transparent electrodes (17) if a droplet occurs on the camera cover glass (15).

Controlled by the control part (30), the voltage application part (40) applies a voltage to the transparent electrodes (17) in order to remove a droplet that has occurred on the camera cover glass (15).

In other words, the voltage application part (40) can alternately apply ground and high voltages, both direct current voltages, to the respective transparent electrodes (17) at pre-set intervals.

For example, a droplet on the surface of the hydrophobic and dielectric layer (18) moves from an electrode to which a ground voltage has been applied to an electrode to which a high voltage has been applied, and ultimately moves to the outermost edge of the hydrophobic and dielectric layer (18), enabling the camera cover glass (15) to be cleaned.

Or, the voltage application part (40) can apply an alternating current voltage to the transparent electrodes (17).

For example, when an AC voltage is applied to the transparent electrode (17), a droplet forming on the surface of the hydrophobic and dielectric layer (18) oscillates by the AC voltage applied to the transparent electrode (17). When the droplet oscillates and moves to the outermost edge of the hydrophobic and dielectric layer (18) along the slope of the camera cover glass (15), enabling the camera cover glass (15) to be cleaned.

FIG. 25 is a flow chart showing the camera droplet detection method according to a preferred embodiment of the invention.

At S2500, the camera droplet detection apparatus measures the impedance of the respective transparent electrodes (17) of the camera cover glass (15).

At S2502, the camera droplet detection apparatus checks if the impedance of any of the measured transparent electrode (17) changes.

At S2504, the camera droplet detection apparatus decides that a droplet has been detected if the impedance of the transparent electrode (17) has changed.

At S2506, the camera droplet detection apparatus removes the droplet by applying a voltage to the transparent electrodes (17) after the droplet has been detected.

FIG. 26 is a flow chart showing the camera droplet detection method according to another embodiment of the invention.

At S2600, the camera droplet detection apparatus photographs an image using the camera module (11).

At S2602, the camera droplet detection apparatus analyzes the photographed image.

At S2604, the camera droplet detection apparatus decides that a droplet has been detected if the result of an analysis of the photographed image finds the image to have any distortion in a certain round shape.

Here, the camera droplet detection apparatus inspects the image for the presence of round droplet forms or calculates the clarity of the image before deciding that the image has distortions in certain round shape if many round droplet forms are detected, or if the clarity of the image falls short of the pre-set clarity standard.

At S2606, the camera droplet detection apparatus removes the droplet by applying a voltage to the transparent electrode (17) upon the droplet being detected.

FIG. 27 is a view showing the cleaning apparatus according to a preferred embodiment of the invention, and FIG. 28 is a view showing the pattern of the electrodes of the cleaning apparatus according to a preferred embodiment of the invention.

According to a preferred embodiment of the invention, the cleaning apparatus can be applied to the cover glass of a camera lens as shown in FIG. 27. Of course, according to a preferred embodiment of the invention, the cleaning apparatus can be applied to all objects that require removal of droplets forming on surfaces like windshields in addition to the cover glass of camera lenses, and the following description assumes, for an understanding of the invention and for the sake of convenience, that the cleaning apparatus (100) in a preferred embodiment of the invention is applied to the cover glass of a camera lens.

The cleaning apparatus (100) can have a patterned structure of multiple electrodes separate from one another on top of a microchip manufactured through the MEMS process and can remove a droplet forming on the surface by applying a DC voltage or an AC voltage to the multiple electrodes.

For example, the cleaning apparatus can change the surface tension of a droplet by applying differing direct current voltages (high and ground) alternately to the respective electrodes. In this case, the droplet will move from an electrode to which a high voltage has been applied, to an electrode to which a ground voltage has been applied (i.e., towards the outer edge of the camera lens).

Furthermore, the cleaning apparatus can change the surface tension of a droplet by causing the droplet to oscillate by application of a low-frequency alternating current voltage to the electrodes. As shown in FIG. 27, if the camera lens has some degree of slope relative to the flat surface, the droplet will move downwards while oscillating (i.e., towards the outer edge of the camera lens cover glass).

Particularly, the cleaning apparatus (100) in a preferred embodiment of the invention applies a low-frequency AC voltage as well as a high-frequency AC voltage based on the frequency pre-set to the multiple electrodes in order to remove not only conductive but also non-conductive droplets. In other words, the cleaning apparatus applies a high-frequency AC voltage to the multiple electrodes and switches on/off the applied high-frequency AC voltage to low frequency, simultaneously applying both high-frequency and low-frequency AC voltages to the multiple electrodes, thereby removing both non-conductive and conductive droplets.

For reference, if only a low-frequency voltage is applied to the multiple electrodes, the conductive droplet oscillates at a low frequency because surface tension changes periodically, while the non-conductive droplet moves by such oscillation but remains unchanged.

Also, if only a high-frequency voltage is applied to the multiple electrodes, the conductive droplet oscillates at a high frequency because surface tension changes periodically, but it does not move but only flattens on the surface, while the non-conductive droplet flattens on the surface and neither oscillates nor moves despite changing surface tension.

On the other hand, if the high-frequency AC voltage applied to the multiple electrodes is switched on/off to low frequency, both conductive and non-conductive droplets repeatedly flatten on the surface and oscillate on a periodic basis, move by such oscillation, and eventually get removed.

In a preferred embodiment of the invention, the multiple electrodes are divided into multiple high voltage electrodes and multiple ground voltage electrodes, and the high voltage electrodes and ground voltage electrodes are placed alternately in series as they remain physically separated on the cover glass surface of the camera lens. Here, the multiple high voltage electrodes and multiple ground voltage electrodes come integrated respectively, allowing high voltage electrodes to be connected to one another and ground voltage electrodes to one another.

For example, referring to FIG. 28, the high voltage electrodes and ground voltage electrodes each have a comb structure and can be placed in an interlocking pattern without coming into contact with one another.

FIG. 29 is a view schematically illustrating the structure of the cleaning apparatus according to a preferred embodiment of the invention, and FIG. 30 to FIG. 33 are views explaining the cleaning apparatus according to a preferred embodiment of the invention. The following describes the cleaning apparatus in a preferred embodiment of the invention based on FIG. 29, but also with reference to FIG. 30 to FIG. 33.

According to a preferred embodiment of the invention, the cleaning apparatus comprises glass (substrate) (2900), electrodes (2902), a dielectric layer (2904), a hydrophobic layer (2906), a voltage application part (2908) and a switching part (2910).

The glass (2900) is the bottommost layer of the cleaning apparatus and serves as a substrate for the cleaning apparatus.

Meanwhile, the electrodes (2902) are transparent electrodes and can form a certain pattern as they are placed in series on top of the glass (2900).

In other words, as described in FIG. 28, the electrodes (2902) are placed in series so that the multiple high voltage electrodes in an integrated form and the multiple ground voltage electrodes in an integrated form alternate.

Meanwhile, as shown in FIG. 29, the dielectric layer (2904) is stacked on top of the electrodes (2902) and can fill the gaps between the respective electrodes (2902).

For reference, the dielectric layer (2904) can contain more than one type of substance selected from a group consisting of parylene C, teflon, and metal oxides.

Meanwhile, the hydrophobic layer (2906) is the topmost layer of the cleaning apparatus, has a droplet form on its surface, and can consist of a fluid like water and a substance with low hydrophilicity. Therefore, a droplet can easily move on the surface of the hydrophobic layer (2906).

The voltage application part (2908) applies an alternating current voltage at a higher frequency than the reference frequency pre-set to the electrodes (2902).

The switching part (2910) switches on/off the high-frequency AC voltage to lower frequency than the high frequency AC voltage. For example, the switching part (2910) can control the voltage application part (2908) so that it can generate high frequency AC voltages in a period corresponding to low frequency. Or, the switching part (2910) can switch on/off the high frequency AC voltage produced from the voltage application part (2908) between the voltage application part (2908) and the electrodes (2902).

By switching high frequency AC voltages on/off, the switching part (2910) can generate low frequency AC voltages and conductive and non-conductive droplets forming on the surface of the hydrophobic layer (2906) start oscillating as high-frequency AC voltage and low-frequency AC voltage are simultaneously applied to the electrodes (120).

If the glass (2900) has some degree of slope relative to the flat surface, the droplet moves to the outer edge of the hydrophobic layer (2906) along the slope of the glass (110), enabling the glass (2900) to be cleaned.

In another embodiment, the cleaning apparatus can comprise a frequency generating part (not shown) that causes high-frequency and low-frequency voltages at the same time, in place of the voltage application part (2908) and the switching part (2910).

The frequency generating part applies a certain voltage to the electrodes (2900) while controlling all frequencies both higher and lower than the reference frequency so that they occur all at once within a single period. Then, as high-frequency and low-frequency voltages are applied to the electrodes (2902), both conductive and non-conductive droplets are removed, enabling the glass (2900) to be cleaned.

For example, referring to FIG. 30, if a high-frequency AC voltage applied to the electrodes (2902) is switched on/off to a relatively lower frequency, the angle of contact between the droplet and the surface of the hydrophobic layer (2906) repeatedly changes, causing both non-conductive and conductive droplets to oscillate regularly.

In other words, a conductive droplet oscillates by the principle of electrowetting-on-dielectric when a low-frequency AC voltage is applied to the electrodes (2902), while a non-conductive droplet oscillates by the principle of dielectrophoresis when a high-frequency AC voltage is applied to the electrodes (120). Here, the principle of dielectrophoresis refers to an event in which a nonpolar particle exposed to an irregular AC electric field induces a dipole and becomes subject to a force in a direction where the field has a large gradient or the one where it has a small gradient.

For example, referring to FIG. 31, as shown in (a) of FIG. 31, a conductive droplet can have surface tension change by the principle of electrowetting-on-dielectric, causing the contact angle between the droplet and the surface of the hydrophobic layer (2906) to change. And as shown in (b) of FIG. 31, for the non-conductive droplet, surface tension changes by the principle of dielectrophoresis, causing the contact angle between the droplet and the surface of the hydrophobic layer (2906) to change.

When droplets occurring on the surface of the hydrophobic layer (2906) oscillate, adhesion decreases between the droplet and the surface of the hydrophobic layer (2906). So if the surface of the hydrophobic layer (2906) is tilted, when the cleaning apparatus operates according to a preferred embodiment of the invention, as shown in FIG. 32, the droplet occurring on the surface of the hydrophobic layer (2906) can slide towards the bottom due to the pull of gravity. (a) of FIG. 32 represents a conductive droplet oscillating and sliding while (b) represents a non-conductive droplet oscillating and sliding.

And if the hydrophobic layer (2906) has a tilted surface, when a droplet occurring on the hydrophobic layer (2906) surface oscillates, it causes a difference between the contact angle in the droplet's moving direction and the contact angle in the direction opposite to said moving direction. Such a difference helps the droplet slide downwards, allowing the droplet to slide even on the surface of a hydrophobic layer (2906) with a very small slope.

Also, since the electrodes (2902) are created in a comb structure as described in FIG. 28, the angle of contact between droplet and hydrophobic layer (2906) surface is not regular in all directions, but tends to be greater in the direction in which the electrodes (2902) are oriented, as shown in FIG. 33. In addition, a contact angle difference, which occurs between a droplet's moving direction and the opposite direction when the droplet oscillates on a sloped surface, also tends to be greater in the direction of said orientation. As described above, since the contact angle difference between the droplet's moving direction and the opposite direction helps the droplet slide, the droplet's sliding direction and the orientation of the electrodes (2902) should be brought into alignment in order to make the droplet slide off at a lower voltage.

In other words, the cleaning apparatus in a preferred embodiment of the invention is affected by not only the orientation of its electrodes but also the frequency of on/off switching, when it controls droplets. Since each droplet has a certain frequency unique to it depending on its size, by application of a voltage whose frequency corresponds to the frequency unique to a droplet that has occurred, the droplet will oscillate even more greatly and said droplet can slide more easily on the surface of the hydrophobic layer (2906).

FIG. 34 is a flow chart showing the cleaning method according to a preferred embodiment of the invention.

In FIG. 32, the cleaning apparatus in a preferred embodiment of the invention can be integrated with a car's camera module (not shown) (for instance, AVMS: Around View Monitoring System) and the following describes the flow chart of FIG. 32, with the cleaning apparatus shown in FIG. 29 as subject-matter.

At S3400, the cleaning apparatus receives a droplet removal request signal from a car's camera module in which the driver's request is entered.

At S3410, the cleaning apparatus applies a high-frequency alternating current voltage based on the frequency pre-set to the electrodes (120) according to the received droplet removal request signal.

At S3420, the cleaning apparatus switches the high-frequency AC voltage on/off to a frequency lower than the applied high-frequency AC voltage. Then, as the high-frequency AC voltage switches on/off, it generates a low-frequency AC voltage, and the conductive and non-conductive droplets that have formed on the surface of the hydrophobic layer (2906) start to oscillate as the high-frequency AC voltage and the low-frequency AC voltage are applied simultaneously.

Also, the non-conductive and conductive droplets slide downwards along the slope of the glass (2900) and move towards the outer edge of the hydrophobic layer (2906), enabling the glass (2900) to be cleaned.

At S3430, the cleaning apparatus stops application of high-frequency AC voltages and on/off switching of high-frequency AC voltages either when a preset time elapses or when a droplet removal cancel request signal is entered by the driver.

Meanwhile, the elements of the above-described embodiment will be easily understood from the perspective of a process. In other words, each of the elements can be understood as a process. Furthermore, the process in the above-described embodiment will be easily understood from the perspective of the elements of an apparatus.

INDUSTRIAL APPLICABILITY

The scope of the invention is defined in the appended claims and all variations and modifications derived from the meaning and scope of the claims and their equivalents must be interpreted to fall within the scope of the invention.

The invention claimed is:
1. A cleaning apparatus comprising:
a substrate;
at least one electrode placed on top of the substrate, wherein the at least one electrode comprises a first electrode and a second electrode, the first electrode and the second electrode each comprise first sub-electrodes and second sub-electrodes, respectively, and wherein the first sub-electrodes and the second sub-electrodes each have a comb pattern and are placed in a crisscross pattern, with all of the sub-electrodes physically separated from one another;
a voltage generator that applies a first alternating voltage to the electrodes; and
a switch that switches on/off the applied first alternating voltage,
wherein the first alternating voltage and a second alternating voltage lower than the first alternating voltage are generated in a single period by the switch, both a conductive droplet and a non-conductive droplet on a surface of the cleaning apparatus start oscillating when the first alternating voltage and the second alternating voltage are simultaneously applied to the electrodes, and the conductive droplet and the non-conductive droplet are removed by the oscillation.
2. The cleaning apparatus of claim 1, further comprising;
a dielectric layer stacked on the at least one electrode; and
a hydrophobic layer stacked on the dielectric layer,
wherein the dielectric layer contains more than one type of substance selected from a group consisting of parylene C, teflon, and metal oxides, and
wherein the hydrophobic layer consists of a substance with low hydrophilicity and has the droplets formed on its surface.
3. The cleaning apparatus of claim 2,
wherein the at least one electrode are divided into a plurality of high voltage electrodes and a plurality of ground voltage electrodes, the high voltage electrodes and the ground voltage electrodes are placed alternately in series and physically separated on the substrate, wherein the high voltage electrodes and ground voltage electrodes each have a comb structure and are placed in an interlocking pattern without coming into contact with one another.
4. The cleaning apparatus of claim 3,
wherein an angle of contact between the non-conductive droplet and conductive droplet and the surface of the hydrophobic layer changes, reducing their adhesion, and the droplets move towards an outer edge of the hydrophobic layer by slope of the hydrophobic layer.

* * * * *